United States Patent
Helmore

(10) Patent No.: US 9,605,938 B2
(45) Date of Patent: Mar. 28, 2017

(54) SYSTEM AND METHOD FOR DETERMINING DEFORMED PIPE GEOMETRY

(71) Applicant: E.V. Offshore Limited, Norwich (GB)

(72) Inventor: Steve Helmore, Aberdeen (GB)

(73) Assignee: E.V. Offshore Limited, Norwich (GB)

( * ) Notice: Subject to any disclaimer, the term of this patent is extended or adjusted under 35 U.S.C. 154(b) by 248 days.

(21) Appl. No.: 14/678,627

(22) Filed: Apr. 3, 2015

(65) Prior Publication Data
US 2015/0285607 A1 Oct. 8, 2015

(30) Foreign Application Priority Data
Apr. 4, 2014 (GB) .................................. 1406131.1

(51) Int. Cl.
*G01B 3/24* (2006.01)
*E21B 47/02* (2006.01)
(Continued)

(52) U.S. Cl.
CPC ................ *G01B 3/24* (2013.01); *E21B 47/02* (2013.01); *E21B 47/08* (2013.01); *G01B 3/56* (2013.01);
(Continued)

(58) Field of Classification Search
CPC ... G01B 3/24; G01B 3/56; G01B 5/12; G01B 5/207; G01B 5/252; E21B 47/02; E21B 47/08
(Continued)

(56) References Cited

U.S. PATENT DOCUMENTS

| | | | | |
|---|---|---|---|---|
| 4,722,142 A | * | 2/1988 | Schmidt | G01B 7/105 33/834 |
| 4,851,773 A | * | 7/1989 | Rothstein | G01B 7/281 33/501.9 |

(Continued)

FOREIGN PATENT DOCUMENTS

| | | |
|---|---|---|
| GB | 2088059 A | 11/1980 |
| JP | 2004-205444 A | 7/2004 |

(Continued)

OTHER PUBLICATIONS

Intellectual Property Office, Search Report for Application No. GB1505728.4, May 13, 2015, 6 pages, United Kingdom.

*Primary Examiner* — Yaritza Guadalupe-McCall
(74) *Attorney, Agent, or Firm* — Alston & Bird LLP

(57) ABSTRACT

A method and associated system for determining geometry of a deformed pipe or conduit or wellbore, the method comprising: collecting, determining and/or receiving measurement data indicative of a plurality of radii of the pipe or conduit using equipment centred in the pipe at two or more points a known distance from the measurement point but not at the measurement point itself; selecting a deformation type and/or deformation model; processing the measurement data to determine one or more geometrical properties of the pipe or conduit, the geometrical properties being indicative of, or associated with, one or more deformations, shapes or profiles of at least part of the pipe or conduit; and guiding and/or constraining at least a part of the processing of the measurement data using the selected deformation type or model and/or fitting the selected deformation model to the measurement data.

23 Claims, 17 Drawing Sheets

(51) Int. Cl.
  *E21B 47/08* (2012.01)
  *G01B 3/56* (2006.01)
  *G01B 5/12* (2006.01)
  *G01B 5/207* (2006.01)
  *G01B 5/252* (2006.01)

(52) U.S. Cl.
  CPC .............. *G01B 5/12* (2013.01); *G01B 5/207* (2013.01); *G01B 5/252* (2013.01)

(58) Field of Classification Search
  USPC ...................................................... 33/558.2
  See application file for complete search history.

(56) References Cited

U.S. PATENT DOCUMENTS

| | | | | |
|---|---|---|---|---|
| 4,866,978 A | * | 9/1989 | Biggerstaff | G01B 5/207 33/544.2 |
| 5,359,781 A | * | 11/1994 | Melville | G01B 11/27 33/286 |
| 5,461,793 A | * | 10/1995 | Melville | G01B 11/27 33/286 |
| 5,479,721 A | * | 1/1996 | Wickander | G01B 5/241 33/531 |
| 6,170,344 B1 | | 1/2001 | Ignagni | |
| 6,560,889 B1 | * | 5/2003 | Lechen | G01B 7/13 33/542.1 |
| 6,647,637 B2 | * | 11/2003 | Lechen | G01B 7/13 33/542.1 |
| 8,235,109 B2 | * | 8/2012 | Vaeth | E21B 17/1028 33/544.3 |
| 2015/0285607 A1 | * | 10/2015 | Helmore | E21B 47/02 33/558.2 |

FOREIGN PATENT DOCUMENTS

| | | |
|---|---|---|
| WO | WO 01/75588 A1 | 10/2001 |
| WO | WO 2008/112732 A1 | 9/2008 |
| WO | WO 2009/002763 A1 | 12/2008 |
| WO | WO 2009/117504 A2 | 9/2009 |

\* cited by examiner

SYSTEM AND METHOD FOR DETERMINING DEFORMED PIPE GEOMETRY

CROSS REFERENCE TO RELATED APPLICATIONS

This application claims priority to United Kingdom Application No. 1406131.1, filed Apr. 4, 2014; the contents of which as are hereby incorporated by reference in their entirety.

BACKGROUND

Field of the Invention

The present invention relates to a system and method for determining the geometry of deformed pipes. Particularly but not exclusively, the system and method determine geometrical properties of deformed parts of the pipe, for example, from multi-finger calliper data.

Description of Related Art

Tubulars and boreholes used in a variety of fields such as oil and gas production are often subject to deformations due to, for example, subsidence, mechanical damage, tectonic movement, mishandling, impact from other bodies or from other environmental pressures. Such deformations can impact on operations and safety involving the pipe or borehole, such as conveying tools, sensor or other devices through the pipe or in transporting fluids such as in production or injection operations. As such, it would be beneficial to be able to accurately quantify deformations in pipes and similar structures. Particularly, identifying geometric properties of the deformed sections could influence or guide subsequent operational decisions or control.

BRIEF SUMMARY

Various aspects of the present invention are defined in the independent claims appended herewith. Some preferred features are defined in the dependent claims appended herewith.

According to a first aspect of the present invention is a method of determining geometry of a deformed pipe, conduit, wellbore, pile or other structure.

The method may comprise collecting, determining and/or receiving measurement data. The measurement data may comprise or be indicative of radii of the pipe or conduit, e.g. at a plurality of angles (such as azimuthal angles) and/or positions along the pipe or conduit.

The measurement data may comprise data collected using a measuring device, e.g. a calliper tool, such as a multi-fingered calliper tool. The measuring device may be centred in the pipe at two or more points, which may be a known distance from the radii measurement point, e.g. of the measuring device, but may not be at the measurement point itself.

The method may comprise selecting a deformation type and/or selecting a deformation model. The deformation type or model may comprise an expected, estimated or determined deformation type or model. The model may be or comprise an initial model. The model may be or comprise a standard or pre-defined model.

The method may comprise processing the measurement data to determine one or more geometrical properties of the pipe, conduit or other structure, which may be indicative of, or associated with, deformations, shapes or profiles of at least part of the pipe or conduit or other structure.

The method may comprise guiding and/or constraining at least a part of the processing using the selected deformation type or model and/or fitting the selected deformation model with or to the measurement data.

The present inventors have found that using a model representative of an expected, estimated, typical or determined deformation type to constrain or guide the processing of the measurement data to determine one or more geometrical properties of the pipe, conduit or structure, it may be possible to more accurately arrive at a correct or more accurate determination of pipe geometry.

The method may comprise determining, collecting and/or receiving orientation data. The orientation data may indicate an orientation of the measurement data. The orientation data may be indicative of a position or orientation of one or more callipers of the calliper tool used to collect the associated measurement data. The orientation data may indicate which measurement data is associated with a specified or known orientation or direction. For example, the orientation data may be indicative of the uppermost or downwardmost data collected by the measuring device or data collected by the uppermost or downwardmost calliper of the measuring device.

The method may comprise determining eccentricity of the measuring device. The eccentricity may be representative of the difference between the centreline of the measuring device at the measurement point and the centreline of the pipe, conduit or other structure.

The method may comprise calculating the eccentricity of the measuring device at a plurality of depths or locations along the pipe, conduit or structure. The eccentricity may be determined by determining the radius of the pipe, conduit or structure measured by a plurality of callipers and preferably each calliper of the measuring device. The eccentricity may be determined from variations in radius determined by the plurality of callipers. The eccentricity may be determined from a fit, such as a least squares fit, of a curve representing pipe radius measured from an eccentred point to the calliper measurements and angles at which the respective radii are measured.

The method may comprise re-orienting the data, for example such that the uppermost data or data collected from the uppermost calliper, e.g. as determined using the orientation data, is uppermost.

The method may comprise determining eccentricity projected into, e.g. only into, one or more planes or directions, which may be through the pipe, conduit or structure, e.g. in two planes or directions. The planes or directions may be radial planes or directions comprising the centreline of the pipe, conduit or structure and may extend in the longitudinal direction of the pipe, conduit or other structure. At least one of the planes or directions may be perpendicular or orthogonal to at least one of the other planes or directions. The planes or directions may comprise a vertical plane or direction and/or a cross-well or horizontal plane or direction. For example, the vertical plane or direction may comprise a plane or direction including the centreline of the pipe, conduit or structure and the parts of the pipe indicated as uppermost and/or downwardmost by the orientation sensors. The cross well or horizontal plane or direction may comprise the plane or direction that is perpendicular or orthogonal to the vertical plane or direction.

The present inventors have found that limiting the calculations to eccentricities of measurement data in only selected planes through the pipe, conduit or structure, such as the vertical and cross-well planes, it is possible to substantially reduce the resource and time required to determine the geometry of the pipe, conduit or structure, with little or no loss of accuracy. This may be particularly useful when the geometry determination is being used to support operational decision making or used to control operations or process parameters.

The method may comprise identifying zones, parts or portions of the pipe, conduit or other structure for which the eccentricity, measurement data or other data derived therefrom is anomalous, e.g. if the eccentricity, measurement data or other data derived therefrom varies by more than a threshold amount or corresponds to a predetermined pattern. The method may comprise determining deformation, shape or profile of the pipe, conduit or structure for those zones, parts or portions of the pipe, conduit or structure determined as having anomalous eccentricities.

The present inventors have beneficially found signature patterns in eccentricity that may be indicative of specific types of deformations. This may allow types of deformation to be identified and may thereby allow constrained calculations of geometry in those regions to quantify the deformation.

The method may comprise applying a correction for gravity or other low frequency effects to the measurement data. The correction for gravity or other low frequency effects may be dependent on the orientation data. For example, the correction for gravity or other low frequency effects applied to each measurement datum may vary depending on the azimuthal angle around the centreline of the measuring device of the datum or the calliper that collected the datum, which may be indicated in, or derivable from, the orientation data. This correction may reflect the different effect due to gravity or the other low frequency effects on the upper or lower most calliper relative to an obliquely oriented or cross well calliper. The correction for gravity or other low frequency effects may comprise a calculated correction, e.g. by removing the low frequency components of the measured eccentricity.

The method may comprise receiving tool geometry data. The tool geometry data may comprise corrections to the measurement data that are dependent on the measuring device, and/or properties of the measuring device such as one or more of: number of centralisers, spacing between centralisers, number and/or orientations of callipers, relative positions of centralisers and callipers and/or the like.

The deformation model may define or represent a shape of a section of a pipe having the associated deformation type. The selected deformation type or deformation model may comprise or be indicative of at least one deformation such as at least one of: one or more dog legs or bends, a shear deformation, a buckling deformation and/or a helical deformation or buckling. The deformation model may comprise or be indicative of one or more, e.g. a plurality of, bends or dog legs. Each bend or dog-leg may be defined by two or more depths and one or more offsets. The shear deformation may comprise a lower section of the pipe, conduit or structure being parallel to, but displaced in a crosswise or lateral direction, relative to an upper section of the pipe, conduit or structure and with one or more bends or dog legs between the upper and lower parts. The buckling deformation may comprise the upper part of the pipe, conduit or structure being inline or aligned with the lower part of the pipe, conduit or structure but with a deformation between the upper and lower parts. The helical deformation or buckling may comprise at least a part of the pipe, conduit or structure being in a substantially helical or spiral configuration.

The pipe, conduit or structure may be comprised or located in an outer pipe, conduit or structure, such as a casing. The outer pipe conduit or structure, e.g. casing, may be substantially tubular. A gap or annulus may be defined between at least part or all of the pipe, conduit or structure and the outer pipe, conduit or structure (e.g. the casing). The at least one deformation may define a deformation of the pipe, conduit or structure within the outer pipe, conduit or structure (e.g. the casing). For example, the deformation model may comprise the helical deformation or buckling of at least part of the pipe, conduit or structure, e.g. within the outer pipe, conduit or structure (e.g. casing).

The method may comprise receiving general data about the pipe, conduit or structure, e.g. a nominal diameter or the pipe, conduit or structure.

The method may comprise forming a synthetic model based on the deformation type or deformation model and/or the general data, such as the nominal diameter. The model may comprise a three dimensional or one or more (and preferably two or more) two dimensional initial models of selected parts of the pipe associated with the deformation, e.g. eccentricity in two dimensional planes, such as the vertical and cross well planes.

The method may comprise smoothing the model, e.g. by using smoothing or running average tools or functions.

The method may comprise fitting the model to the measurement data. For example, the method may comprise fitting a theoretical eccentricity, which may be derived from the model, in the two or more planes (e.g. in the vertical and cross well planes), to the eccentricity determined from the measurement data, e.g. in the corresponding planes (e.g. the vertical and cross well planes).

The fitting may comprise an iterative process.

The fitting may comprise an automated process such as optimising or minimising a difference or error function, e.g. using a least squares, monte-carlo, simulated annealing, genetic algorithm, fuzzy logic, neural network and/or similar technique. The fitting may comprise a manual fitting.

The fitting may comprise varying one or more geometrical parameters representing the pipe, conduit or other structure in the model, e.g. one or more diameters, radii, and/or coordinates of a wall of the pipe, conduit or structure, one or more bend or dog-leg angles, depths or lengths, and/or the like.

The method may comprise re-calculating the eccentricity derived from the model after varying the one or more geometrical parameters representing the pipe, conduit or other structure in the model.

The method may comprise applying a termination condition, e.g. if the difference or error function or a quality of fit function is within a given threshold or a reduction in difference or error function over one or more consecutive iterations is within a threshold.

The one or more geometrical parameters of the model after the fitting process has completed or terminated may comprise or be used to determine the geometry of the pipe, conduit or structure.

The method may comprise directly determining the geometry of the pipe, conduit or other structure. The method may comprise determining the geometry of the pipe using an inversion scheme.

The method may comprise deconvolving the eccentricity determined from the measurement data using known geometric properties and/or a known response of the measuring device to produce deconvolved data. The deconvolved data may comprise curves or other data representative of local change of well angle. The deconvolving may comprise only deconvolving the eccentricity in two or more planes or directions, such as the vertical and cross well planes.

The method may comprise applying a high and/or low frequency filter, e.g. to remove high and/or low frequency measurement data, e.g. above or below one or more frequency thresholds.

The method may comprise applying one or more depth integrations to the deconvolved data or measurement data.

The method may comprise performing a first depth integration, which may comprise integrating the deconvolved data, e.g. in the two or more planes or directions. The method may comprise determining well angle data, which may be determined by the first integration. The first integration may comprise an integration over the length of the part or portion of the pipe, conduit or structure.

The method may comprise constraining and/or guiding the first integration using the selected deformation type or model. The constraining of the first integration may comprise producing zero net angle change, e.g. over the length of the pipe, conduit or structure associated with the deformation.

The first integration may have a plurality of possible solutions. By constraining the integration using the selected deformation type or model, it may be possible to more surely or accurately determine the well angle data.

The method may comprise a second integration, which may comprise integrating the well angle data, e.g. in the two or more planes or directions. The method may comprise determining centre line displacement, e.g. the displacement of the centre line of the pipe, conduit or structure from the well track. The centre line displacement may be determined by the second integration. The second integration may comprise an integration over the length of the part of portion of the pipe, conduit or structure.

The method may comprise constraining and/or guiding the second integration using the selected deformation type or model. The constraining of the second integration may comprise producing a fixed net displacement of the pipe, conduit or other structure, e.g. over the length of the pipe, conduit or structure associated with the deformation.

When the pipe, conduit or structure is contained or located within the outer pipe, conduit or structure (e.g. casing), as shown in FIG. 3, and particularly (though not essentially) when the model is a helical buckling model, such as that shown in FIG. 4, then the method optionally comprises constraining the results, e.g. of the second integration, so that a radial difference or excursion of the centre line of the pipe, conduit or structure from the well track is less than a function of the spacing, gap or distance between the pipe, conduit or structure and the outer pipe, conduit or structure (e.g. casing), e.g. the annulus size. For example, the method may comprise constraining the results, e.g. of the second integration, so that the radial difference or excursion of the centre line of the pipe, conduit or structure from the well track is less than the spacing, gap or distance between the pipe, conduit or structure and the outer pipe, conduit or structure (e.g. casing), e.g. the annulus size. This approach increases the likelihood of a realistic description of the tubing shape being obtained, may highlight any damage, such as splits and crushing, and may give basis for analysing well access restrictions and/or access for given tools. The method may comprise applying a high pass filter, which may be configured to constrain the radial difference or excursion of the centre line of the of the centre line of the pipe, conduit or structure from the well track.

The second integration may have a plurality of possible solutions. By constraining the integration using the selected deformation type or model, it may be possible to more surely or accurately determine the centre line displacement.

The method may comprise determining eccentricities of the measurement device, e.g. in two or more planes or directions, from the determined centre line displacement.

The method may comprise comparing the determined eccentricities of the pipe, conduit or structure with the eccentricities determined from the measurement data. This may validate the model and may provide an extra safeguard that the selected deformation model or type and/or the calculated geometry is correct.

The method may comprise reconstructing or determining a three dimensional model, e.g. from the determined centre line and the measurement data. Determining the three dimensional model may comprise re-centering the measurement data to the determined centre line.

The method may comprise determining clearance and/or maximum length and/or diameter limits for a tool, load or other device to be inserted into the pipe, conduit or other structure, which may be determined from the determined geometry of the pipe, conduit or structure, e.g. the determined three dimensional model. The determining of the clearance and/or maximum length and/or diameter limits may comprise simulating passage of the tool or other device or load through a computational model of an inside surface of the pipe, conduit or passage. The simulation may comprise representing the tool or other device or load as a rigid cylinder or other radially symmetric object. The clearance may be the minimum distance between an outer surface of the tool or other device or load and the inside surface of the pipe, conduit or passage, e.g. from any or all points on the tool, load or other device. The simulation may comprise calculating the position of the tool or other device or load that gives a maximum clearance, e.g. using an iterative procedure.

The method may comprise calculating the position of the tool or other device or load that gives a maximum clearance for each of a plurality of depths or positions of the tool or other device or load over at least part of the pipe, conduit or passage.

The simulation may comprise determining a starting position of the tool, load or other device for one or more or each of the depths or positions. The simulation may comprise setting a starting position in which the centres of the ends of the tool, load or other device are located on a centre line of the pipe, conduit or structure, e.g. for one or more or each of the depths or positions. The simulation may comprise determining a position and/or azimuth on the tool surface that is furthest from the centre line of the pipe, conduit or structure, e.g. for one or more or each of the depths or positions. The simulation may comprise moving and/or rotating the tool, load or other device, for example by a function, e.g. half, of the distance between the determined position on the on the tool surface that is furthest from the centre line of the pipe, conduit or structure and the centre line of the pipe, conduit or other structure, e.g. for one or more or each of the depths or positions. The tool, load or other device may be moved and/or rotated in a direction opposite to the determined azimuth of the position on the tool surface that is furthest from the centre line of the pipe, conduit or structure.

The method may comprise determining if all, e.g. all points, of the tool, load or other device is/are inside the pipe, conduit or other structure. The method may comprise returning a warning, alert or other flag if any of the tool, load or other device is not inside the pipe, conduit or other structure, e.g. the tool, load or other device will not fit through the pipe, conduit or other structure.

If it is determined that the tool fits through the pipe, e.g. at that depth or position in the pipe, conduit or other structure, then the method, e.g. the simulation, may comprise optimising the position and/or orientation of the tool, load or other device at that depth or position in the pipe, conduit or other structure, e.g. with respect to clearance between the tool, load or other object and the pipe, conduit or other structure. The optimisation may be or comprise an iterative optimisation. The optimisation may start with the tool, load, or other device in the determined starting position and/or azimuth. The method, e.g. the optimisation, may comprise setting a step, e.g. a pre-determined or pre-set step, which may initially be set at a fraction of the nominal diameter of the pipe, conduit or other structure.

The method, e.g. the optimisation, may comprise determining the position, depth and/or azimuth of the tool, load or other device having a minimum clearance between the tool, load or other device and the pipe, conduit or other structure, e.g. for any or all points along the length of the tool. The optimisation may comprise reducing, e.g. halving, the step if the iteration is not the first iteration and the determined clearance is less than the clearance determined during a previous or preceding iteration. The method, e.g. the optimisation, may comprise moving the tool, load or other device a distance equal or corresponding to the current step value, e.g. away from the position and/or orientation of the tool, load or other device currently determined as having the minimum or lowest clearance. The optimisation may comprise terminating the optimisation if a termination condition is met, e.g. if the step is less than a pre-set termination value. The position and/or azimuth of the tool, load or other device when the optimisation terminates and/or the clearance thereof, may be stored, recorded or output.

If the termination condition is not met, the optimization may comprise returning to the step of determining the depth and/or azimuth of the minimum clearance between the tool, load or other device and the pipe, conduit or other structure, e.g. as part of an iterative optimisation.

The method may comprise performing the simulation for a variety of lengths and/or diameters of the tool or other device or load, e.g. in order to determine a maximum length and/or diameter of the tool or other device or load that will pass through the pipe, conduit or passage, e.g. if the clearance is greater than a threshold or greater than zero for one or more or all of the depths or positions along at least the part of the pipe, conduit or passage for a given length and/or diameter of the tool or other device or load. The method may comprise providing an indication if a given tool or other device or load can and/or can't pass through the pipe, conduit or passage, e.g. if the clearance is greater than a threshold or greater than zero for one or more or all of the depths or positions along the at least part of the pipe, conduit or passage. The method may comprise storing the determined clearances for each depth and/or position and/or for each length and/or diameter of the tool or other device or load, e.g. for replay or retrieval later. The method may comprise providing a warning, alert or other flag if the tool, load or device cannot pass through the pipe, conduit or passage.

The method may comprise selecting or adjusting the one or more tools, or other devices or load for passing or running through the pipe, conduit, borehole or structure based on the determined geometry of the pipe, conduit, borehole or other structure. For example, the method may comprise selecting a tool or other device or load with a diameter, length, rigidity and/or other configuration that would allow it to pass through the pipe, conduit, borehole or structure or calculating and adjusting the maximum or optimal diameter, length, rigidity or other configuration of the tool or other device or load to fit through the pipe, conduit or other structure.

The method may comprise deducing or confirming the cause of deformation, for example subsidence, mechanical damage, tectonic movement, impact from other bodies or environmental pressure.

The method may comprise controlling an operation involving or using the pipe, conduit or other structure based on the determined geometrical properties. The method may comprise adjusting one or more parameters of the operation. For example, the method may comprise adjusting a pressure, flow rate, valve opening amount, pump speed, fluid composition and/or the like of a production or injection operation using the pipe, conduit or structure based at least partly on the determination of geometry of the pipe, conduit or structure.

Although references are made above to a pipe, conduit or other structure, it will be appreciated that the method may be applied to any other suitable hollow structure, passageway, bore, well or other structure.

According to a second aspect of the present invention is a method of determining clearance and/or maximum length and/or diameter limits for a tool, load or other device to be inserted into a pipe, conduit or other structure. The method may comprise determining or providing a model defining a geometry of the pipe, conduit or structure, e.g. a model at least partially or wholly determined using the method of the first aspect. The model may be at least partially or wholly determined using, or derived from other means or measurements, e.g. from one or more gyro surveys.

The method may comprise simulating passage of the tool or other device or load through the model of an inside surface of the pipe, conduit or passage. The simulation may comprise calculating the position of the tool or other device or load that gives a maximum clearance for each of a plurality of depths or positions of the tool or other device or load over at least part of the pipe, conduit or passage.

The simulation may comprise representing the tool or other device or load as a rigid cylinder or other radially symmetric object. The clearance may be the minimum distance between an outer surface of the tool or other device or load and the inside surface of the pipe, conduit or passage, e.g. from any or all points on the tool, load or other device. The simulation may comprise calculating the position of the tool or other device or load that gives a maximum clearance using an iterative procedure.

The simulation may comprise determining a starting position of the tool, load or other device for one or more or each of the depths or positions. The simulation may comprise setting a starting position in which the centres of the ends of the tool, load or other device are located on a centre line of the pipe, conduit or structure, e.g. for one or more or each of the depths or positions. The simulation may comprise determining a position and/or azimuth on the tool surface that is furthest from the centre line of the pipe, conduit or structure, e.g. for one or more or each of the depths or positions. The simulation may comprise moving the tool, load or other device, for example by a function, e.g. half, of the distance between the determined position on the on the tool surface that is furthest from the centre line of the pipe, conduit or other structure, e.g. for one or more or each of the depths or positions. The simulation may comprise moving or rotating the tool, load or other device in a direction opposite to the determined azimuth of the position on the tool surface that is furthest from the centre line of the pipe, conduit or structure.

The method may comprise determining if all, e.g. all points, of the tool, load or other device is/are inside the pipe, conduit or other structure. The method may comprise returning a warning, alert or other flag if any of the tool, load or other device is not inside the pipe, conduit or other structure, e.g. the tool, load or other device will not fit through the pipe, conduit or other structure.

If it is determined that the tool fits through the pipe, e.g. at that depth or position in the pipe, conduit or other structure, then the method, e.g. the simulation, may comprise optimising the position and/or orientation of the tool, load or other device at that depth or position in the pipe, conduit or other structure, e.g. with respect to clearance between the tool, load or other object and the pipe, conduit or other structure. The optimisation may be or comprise an iterative optimisation. The optimisation may start with the tool, load, or other device in the determined starting position and/or azimuth. The method, e.g. the optimisation, may comprise setting a step, e.g. a pre-determined or pre-set step, which may initially be set at a fraction of the nominal diameter of the pipe, conduit or other structure.

The method, e.g. the optimisation, may comprise determining the position, depth and/or azimuth of the tool, load or other device having a minimum clearance between the tool, load or other device and the pipe, conduit or other structure, e.g. for any or all points along the length of the tool. The optimisation may comprise reducing, e.g. halving, the step if the iteration is not the first iteration and the determined clearance is less than the clearance determined during a previous or preceding iteration. The method, e.g. the optimisation, may comprise moving the tool, load or other device a distance equal or corresponding to the current step value, e.g. away from the position and/or orientation of the tool, load or other device currently determined as having the minimum or lowest clearance. The optimisation may comprise terminating the optimisation if a termination condition is met, e.g. if the step is less than a pre-set termination value. The position and/or azimuth of the tool, load or other device when the optimisation terminates and/or the clearance thereof, may be stored, recorded or output.

If the termination condition is not met, the optimization may comprise returning to the step of determining the depth and/or azimuth of the minimum clearance between the tool, load or other device and the pipe, conduit or other structure, e.g. as part of an iterative optimisation.

The method may comprise performing the simulation for a variety of lengths and/or diameters of the tool or other device or load, e.g. in order to determine a maximum length and/or diameter of the tool or other device or load that will pass through the pipe, conduit or passage, e.g. if the clearance is greater than a threshold or greater than zero for one or more or all of the depths or positions along at least the part of the pipe, conduit or passage for a given length and/or diameter of the tool or other device or load. The method may comprise providing an indication if a given tool or other device or load can and/or can't pass through the pipe, conduit or passage, e.g. if the clearance is greater than a threshold or greater than zero for one or more or all of the depths or positions along the at least part of the pipe, conduit or passage. The method may comprise storing the determined clearances for each depth and/or position and/or for each length and/or diameter of the tool or other device or load, e.g. for replay or retrieval later. The method may comprise providing a warning, alert or other flag if the tool, load or device cannot pass through the pipe, conduit or passage.

The method may comprise selecting or adjusting the one or more tools, or other devices or load for passing or running through the pipe, conduit, borehole or structure based on the determined geometry of the pipe, conduit, borehole or other structure. For example, the method may comprise selecting a tool or other device or load with a diameter, length, rigidity and/or other configuration that would allow it to pass through the pipe, conduit, borehole or structure or calculating and adjusting the maximum or optimal diameter, length, rigidity or other configuration of the tool or other device or load to fit through the pipe, conduit or other structure.

According to a third aspect of the present invention is a system for determining a geometry of a pipe, conduit or other structure. The system may be configured to implement the method of the first aspect and/or the method of the second aspect. The system may comprise processing apparatus. The processing apparatus may be configured to perform the method of the first aspect and/or the method of the second aspect.

The processing apparatus may be configured to implement or comprise an eccentricity module for determining the eccentricity of a measuring device at a plurality of depths or locations along the pipe, conduit or wellbore. The measuring device may be centred in the pipe at two or more points, which may be a known distance from the radii measurement point but may not be at the measurement point itself. The eccentricity module may be configured to determine eccentricity projected into two or more planes or directions.

The processing apparatus may be configured to implement or comprise a reorientation module for reorienting the measurement data based on orientation data collected by an orientation sensor for determining the orientation of the measuring device.

The processing apparatus may be configured to implement or comprise a model fitting module for fitting a model to the measurement data, e.g. by fitting a theoretical eccentricity derived from the model in two or more planes to the eccentricity determined from the measurement data in the two or more planes.

The processing apparatus may be configured to implement or comprise a full inversion module for determining the geometry of the pipe, conduit or other structure. The full inversion module may be configured to deconvolve the eccentricity determined from the measurement data using known geometric properties and/or a known response of the measuring device to produce deconvolved data, wherein the deconvolved data comprises curves or other data representative of local change of well angle. The full inversion module may comprise or be configured to implement a high and/or low frequency filter, e.g. to remove high and/or low frequency measurement data above and/or below one or more frequency thresholds. The full inversion module may be configured to perform a first depth integration comprising integrating the deconvolved data to determine well angle data. The full inversion module may be configured to constrain and/or guide the first integration using the selected deformation type or model. The full inversion module may be configured to perfrom a second integration, wherein the second integration comprises integrating the well angle data to determine displacement of the centre line of the pipe, conduit or wellbore from a well or pipe track. The full inversion module may be configured to constrain and/or guide the second integration using the selected deformation type or model.

The full inversion module may be configured to constrain the results so that a radial difference or excursion of the centre line of the pipe, conduit or structure from the well track is less than a function of the spacing, gap or distance between the pipe, conduit or structure and an outer pipe, conduit or structure (e.g. casing), e.g. the annulus size. The full inversion module may be configured to constrain the radial difference or excursion of the centre line of the pipe, conduit or structure when the pipe, conduit or structure is comprised or located in the outer pipe, conduit or structure (e.g. casing), and particularly (though not essentially) when the model is a helical buckling model. For example, the full inversion model may be configured to constrain the radial difference or excursion of the centre line of the pipe, conduit or structure from the well track to be less than the spacing, gap or distance between the pipe, conduit or structure and the outer pipe, conduit or structure (e.g. casing), e.g. the annulus size. The system may comprise a high pass filter, which may be configured to perform the constraining of the radial difference or excursion of the centre line of the pipe, conduit or structure.

It will be appreciated that one or more or each of the modules described above may be implemented in software and/or firmware and/or hardware and/or any combination thereof.

The calliper device may be configured to determine the measurement data. The measuring device may comprise an orientation sensor for determining the orientation data. The orientation sensor may be configured to determine which calliper of the measuring device is the uppermost or lowermost. The system may be configured to determine an angle or orientation of a plurality and preferably each calliper from the orientation data determined by the orientation sensor.

The measuring device may comprise one or more centralisers for centralising the calliper device, e.g. the body of the calliper device, in the pipe, conduit or other structure.

The measuring device may comprise at least one and preferably a plurality of callipers, which may be movable outwardly of the body of the calliper device. The measuring device may be configured to determine a radial extension of each calliper, and may be configured to thereby determine a distance from the body to the inner surface of the pipe, conduit or other structure and/or at least one radius or diameter of the pipe, conduit or structure.

The system may be configured to determine clearance and/or maximum length and/or diameter limits for a tool or other device or load to be inserted into the pipe, conduit or other structure, which may be determined from the determined geometry of the pipe, conduit or structure, e.g. the determined three dimensional model. The determining of the clearance and/or maximum length and/or diameter limits may comprise simulating passage of the tool or other device or load through a computational model of an inside surface of the pipe, conduit or passage. The simulation may comprise representing the tool or other device or load as a rigid cylinder or other radially symmetric object. The clearance may be the minimum distance between an outer surface of the tool or other device or load and the inside surface of the pipe, conduit or passage, e.g. from any or all points on the tool, load or other device. The simulation may comprise calculating the position of the tool or other device or load that gives a maximum clearance, e.g. using an iterative procedure. The system may be configured to calculate the position of the tool or other device or load that gives a maximum clearance for each of a plurality of depths or positions of the tool or other device or load over at least part of the pipe, conduit or passage.

The system may be configured to determine a starting position of the tool, load or other device for one or more or each of the depths or positions. The system may be configured to set a starting position of the tool, load or other device in which the centres of the ends of the tool, load or other device are located on a centre line of the pipe, conduit or structure, e.g. for one or more or each of the depths or positions. The system may be configured to determine a position and/or azimuth on the tool surface that is furthest from the centre line of the pipe, conduit or structure, e.g. for one or more or each of the depths or positions. The system may be configured to move the tool, load or other device, for example by a function, e.g. half, of the distance between the determined position on the on the tool surface that is furthest from the centre line of the pipe, conduit or structure and the centre line of the pipe, conduit or other structure, e.g. for one or more or each of the depths or positions. The system may be configured to move or rotate the tool, load or other device in a direction opposite to the determined azimuth of the position on the tool surface that is furthest from the centre line of the pipe, conduit or structure.

The system may be configured to determine if all, e.g. all points, of the tool, load or other device is inside the pipe, conduit or other structure. The system may be configured to provide a warning, alert or other flag if all points, of the tool, load or other device are not inside the pipe, conduit or other structure, e.g. the tool, load or other device will not fit through the pipe, conduit or other structure.

The system may be configured to optimise the position and/or orientation of the tool, load or other structure at that depth or position in the pipe, conduit or other structure if it is determined that the tool fits through the pipe, e.g. at that depth or position in the pipe, conduit or other structure. The optimisation may be an iterative optimisation. The optimisation may start with the tool, load, or other device in the determined starting position and/or azimuth. The system may be configured to set a step, e.g. a pre-determined or pre-set step, which may be set at a fraction of the nominal diameter of the pipe, conduit or other structure.

The system may be configured to determine the depth and/or azimuth of the minimum clearance between the tool, load or other device and the pipe, conduit or other structure, e.g. for any or all points along the length of the tool. The system may be configured to reduce, e.g. halve, the step if the iteration is not the first iteration and the determined clearance is less than the clearance determined during a previous or preceding iteration. The system may be configured to move the tool, load or other device a distance equal or corresponding to the current step value, e.g. away from the position and/or orientation of the tool, load or other device currently determined as having the minimum or lowest clearance. The system may be configured to terminate the optimisation if a termination condition is met, e.g. if the step is less than a pre-set termination value. The position and/or azimuth of the tool, load or other device when the optimisation terminates and/or the clearance thereof, may be stored, recorded or output by the system.

The system may be configured to return to the step of determining the depth and/or azimuth of the minimum clearance between the tool, load or other device and the pipe, conduit or other structure if the termination condition is not met, e.g. as part of an iterative optimisation.

The system may be configured to perform the simulation for a variety of lengths and/or diameters of the tool or other device or load, e.g. in order to determine a maximum length and/or diameter of the tool or other device or load that will pass through the pipe, conduit or passage, e.g. if the clearance is greater than a threshold or greater than zero for one or more or all of the depths or positions along the at least part of the pipe, conduit or passage for a given length and/or diameter of the tool or other device or load. The system may be configured to provide an indication if a given tool or other device or load can and/or can't pass through the pipe, conduit or passage, e.g. if the clearance is respectively greater or less than a threshold or respectively greater or less than zero for one or more or all of the depths or positions along the at least part of the pipe, conduit or passage. The system may comprise or be configured to access data storage, and the system may be configured to store the determined clearances for each depth and/or position and/or for each length and/or diameter of the tool or other device or load, e.g. on the data storage. The system may be configured to replay the simulation later, e.g. based on the stored clearances. The system may be configured to provide a warning, alert or other flag if the tool, load or other device cannot pass through the pipe, conduit or passage.

The system may be comprised in or operatively coupled or configured to be coupled with a controller for controlling one or more equipment items, such as valves, pumps, motors, actuators and/or the like, for performing one or more actions involving the pipe, conduit or passage, e.g. based on the determined geometrical properties. The system may be configured to, for example, adjust a one or more parameters, such as pressure, flow rate, valve opening amount, pump speed, fluid composition and/or the like of a production or injection operation using the pipe, conduit or structure based at least partly on the determination of geometry of the pipe, conduit or structure.

According to a fourth aspect of the present invention is a computer program product configured to at least partially or wholly implement the method of the first and/or second aspect and/or the system of the third aspect. The computer program product may be provided on or comprised in a carrier medium, which may be or comprise a non-transient carrier medium. The computer program product may be loaded into or comprised in a processing apparatus.

It will be appreciated that features analogous to those described above in relation to any of the above aspects may be individually and separably or in combination applicable to any of the other aspects.

Apparatus features analogous to, or configured to implement, those described above in relation to a method and method features analogous to the use and fabrication of those described above in relation to an apparatus are also intended to fall within the scope of the present invention.

BRIEF DESCRIPTION OF THE FIGURES

These and other aspects of the present invention will now be described, by way of example only, with reference to the accompanying drawings, in which.

DETAILED DESCRIPTION OF VARIOUS EMBODIMENTS

Figure 1:
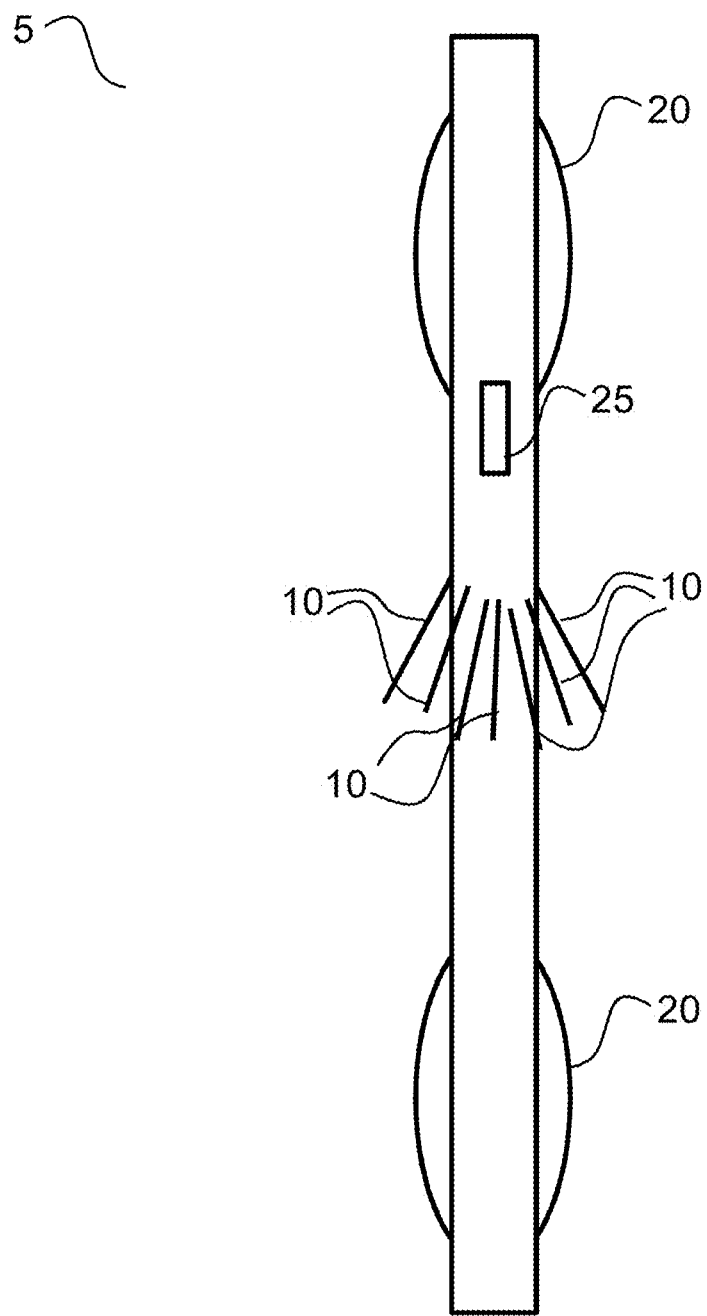
FIG. 1 is a diagrammatic representation of a multi-calliper measurement tool used in an embodiment of the present invention.

FIG. 1 shows a multi-fingered calliper tool 5. Such calliper tools 5 typically comprise a set of 24-80 callipers 10, that measure pipe radius to high precision, e.g. <0.25 mm (<0.01").

There are a variety of suitable calliper tools 5 available. In one example of a suitable calliper tool 5, the callipers 10 are each pivotally mounted in a tool body 15 and biased radially outwardly using suitable biasing means (not shown). Respective rotation sensors (not shown) can then be used to measure the angle of the calliper. In this way, the measured angle of the calliper along with the known length of each calliper 10 and the fixed, known distance between the pivot of the calliper 10 and the centre of the tool body 15 can be used to determine a corresponding radius of a pipe, conduit, wellbore or other passage or hollow body in which the calliper tool 5 is inserted.

Two sets of mechanical centralisers 20 are provided on either side of the callipers 10. For example, the centralisers can typically be positioned ~1 m above and below the callipers 10. The centralisers 20 are configured to hold the tool in the centre of the pipe. The centralisers 20 can be of any type known in the art such as bowstring type centralisers (shown), wheels provided on biased pivoting arms, and the like.

The calliper tool comprises an orientation sensor 25 for measuring an orientation of the calliper tool 5. In particular, the orientation sensor 25 is operable to determine which of the callipers 10 is 'uppermost' in non-vertical pipes or wells, particularly those having a deviation from vertical of greater than approximately 5 degrees. The azimuthal angle of each of the other callipers around the tool body 15 from the uppermost calliper can be also be determined therefrom.

Figure 2:
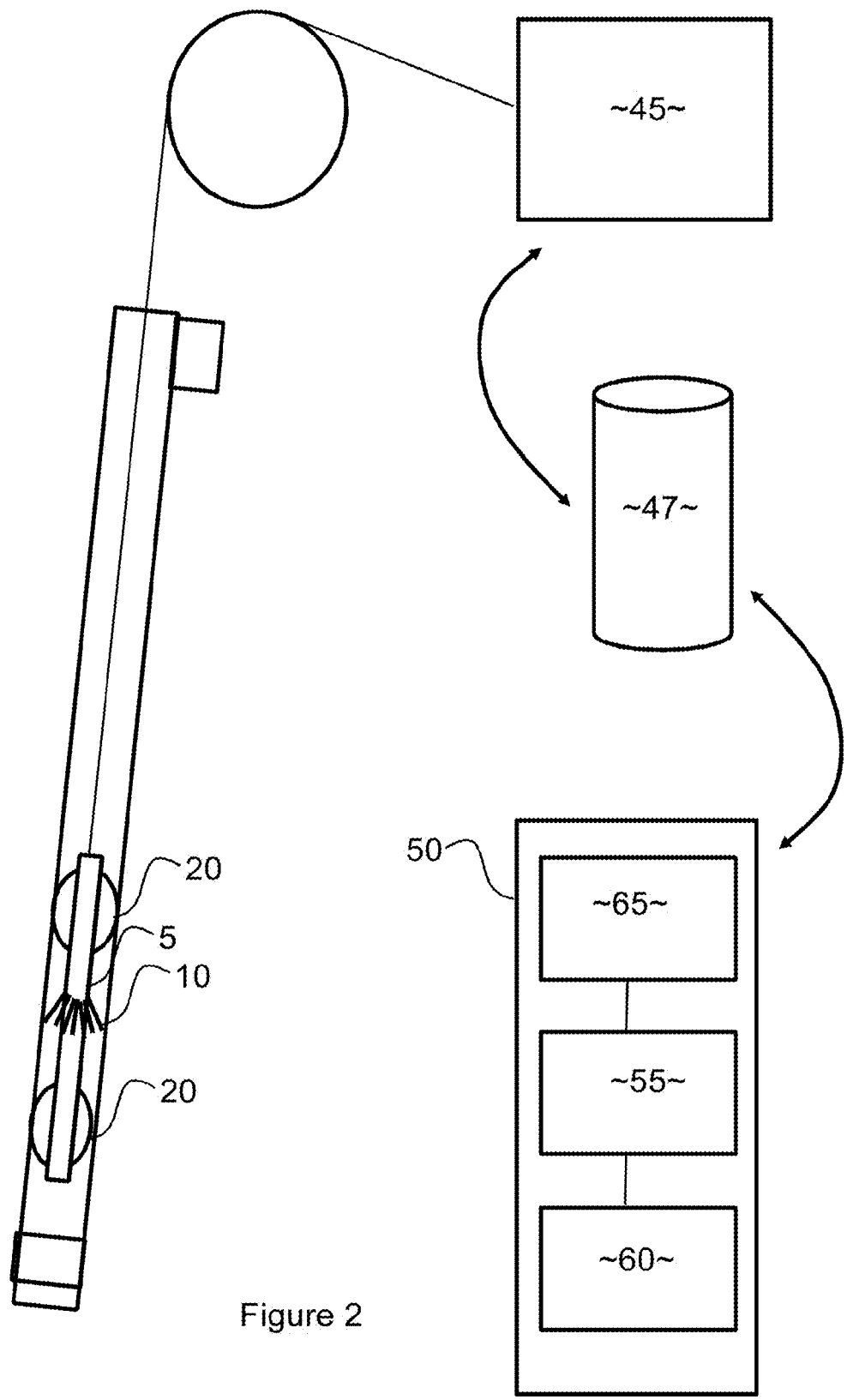
FIG. 2 is a diagrammatic representation of a system according to an embodiment of the present invention.

In use, the calliper tool 5 is lowered down the pipe 30, and then dragged slowly upwards to survey the pipe 30 while taking a set of radial measurements at regular intervals, e.g. every 2-10 mm using the callipers 10, as shown in FIG. 2.

The pipe 30 (or well) can be, for example, an oil or gas production or injection or observation wells, or a well used in water/hydraulic fracking, and/or the like, although a skilled person would appreciate other applications for such a well or pipe 30.

The calliper tool 5 is in communication with a controller 45. The controller 45 is configured to store the measured or calliper data (e.g. the pipe radii measured by the calliper tool 5) and orientation data from the orientation sensor 25 on a suitable data storage medium 47. The calliper data and the orientation data can then be accessed from the data storage medium 47 and processed using a processing unit 50, which is configured to determine geometric properties of the pipe 30. The processing unit 50 comprises a processor 55, memory 60 and communications unit 65. The communications unit 60 is configured to communicate with components such as the data storage medium 47, e.g. by a wired or wireless connection.

Although an embodiment is shown where the processing unit 50 receives data collected by the calliper tool 5 from a suitable data storage medium 47, it will be appreciated that this need not be the case and instead the processing unit could optionally be a stand-alone unit, or configured to receive data directly from the calliper tool 5 and/or may be configured to receive the calliper data via a network or server or the like.

The measured data from the calliper tool 5 comprises a series of radii of the pipe 30 collected at varying azimuthal angles around the centreline of the pipe 30 and at various positions along the pipe 30, along with corresponding orientation data from the orientation sensor 25. The geometrical properties of the calliper tool 5, such as the spacing between the centralisers 20 and the callipers 10, and the like, is known and can be provided for the use of the processing unit 50.

Occasionally, pipe deformation such as shear or buckling can occur. Such deformation can be caused by subsidence, tectonic movement or mechanical damage, for example. Shear deformation is often associated with fault re-activation or slip along weak bedding planes. Buckling typically occurs in or near the reservoir in low angle wells and is due to compaction. In some instances, the pipe 30 (i.e. tubing) is a narrower pipe that conveys gas and/or liquids and is provided inside a wider pipe (i.e. casing) 67, see e.g. FIG. 3. An gap or annulus 68 is provided between the tubing 30 and casing 67. The casing 67 is cemented or otherwise fixed into the formation and provides protection for the tubing 30. However, during certain operations, there may be changes in conditions, such as temperature and/or pressure, experienced by the tubing 30 and/or casing 67. As a result, in certain situations, the relative length of the tubing 30 and casing 67 can change. If inadequate provision has been made for these changes in relative length of the tubing 30 and casing 67, or if equipment or operational failures or errors arise, then stresses, particularly longitudinal compressional stresses, can build in the tubing 30. If these stresses exceed a certain threshold that depends on the construction of the tubing 30, the tubing 30 can wrap itself into a generally helical configuration around the inside of the casing 67, which is termed helical buckling, see e.g. FIG. 4.

These events can result in local distortion of the pipe centre line. Such local shifts in a centre line of the pipe 30 caused by pipe deformation give a recognisable or signature response in the data collected by the calliper tool 5. Examples of common distortions and associated signatures are described herein. However, it will be appreciated that these are not intended to be definitive and it will be appreciated that other deformations and associated signatures would be apparent to a skilled person from the present teaching.

Multi-finger calliper data is usually collected for detection of corrosion, pitting or deposits. In such analyses, the deformation signatures are usually processed out when the data is corrected for a non-centred tool. However, the present inventors have created an efficient and robust method for using multi-fingered calliper data to instead quantify the local distortion of the pipe centre line. Once this is determined, it is possible to 'wrap' the pipe radii data collected by the calliper tool 5 around the corrected pipe centre line (i.e. to re-centre the radii data based on the determined corrected pipe centre line) to give a complete 3D model which preserves other features such as pipe ovalisation and corrosion pitting. This allows analysis of well access limitations and insight into the deformation mechanism, along with providing information that can help operational decisions such as selection of an appropriate maximum tool diameter, or flow rate, or to highlight risks of failure of the pipe and/or the like.

Figure 5:
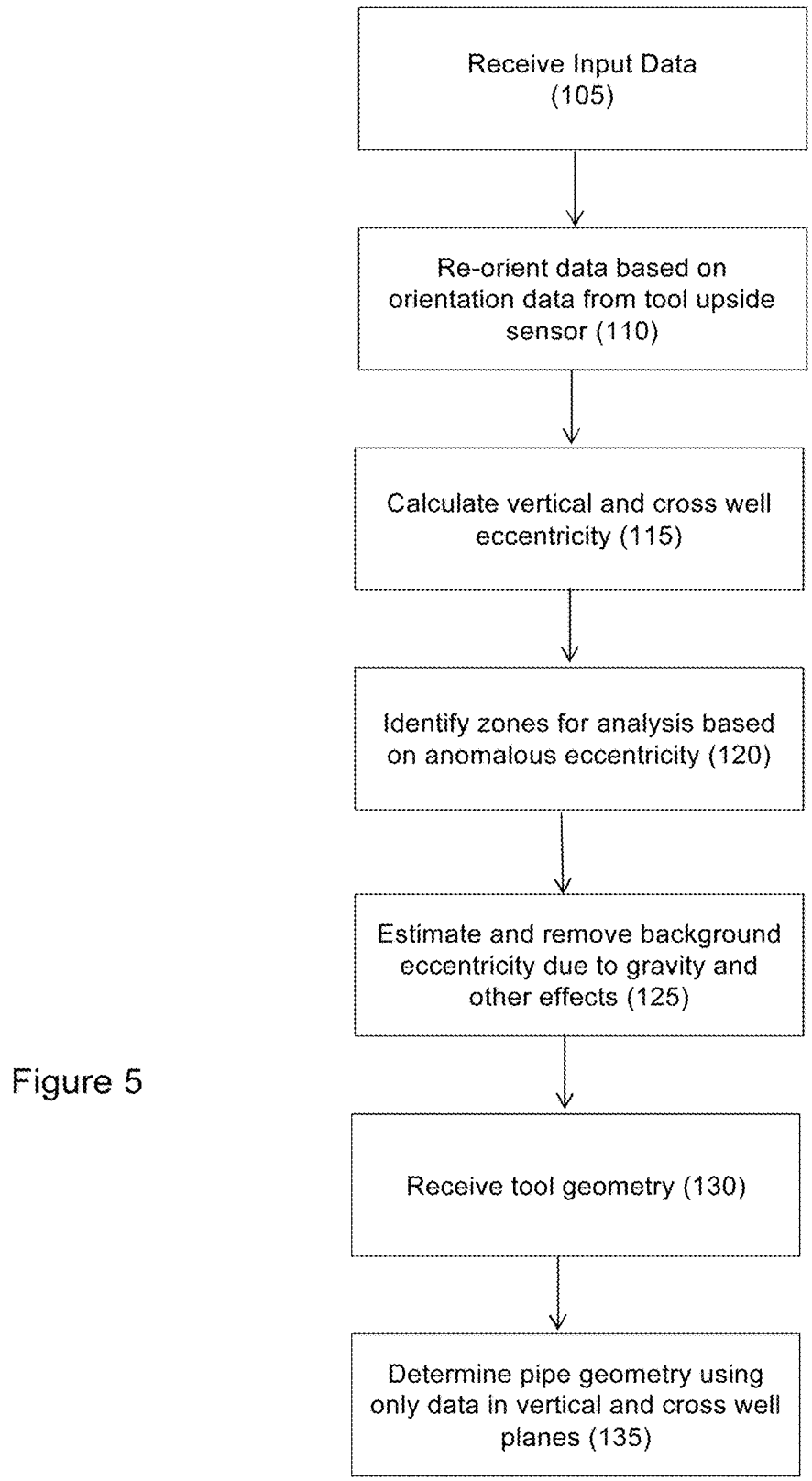
FIG. 5 is a flow diagram illustrating a method according to an embodiment of the present invention.

The method of embodiments of the present invention comprises a pre-processing part, as illustrated in FIG. 5. In this case, the measured data, including the pipe radii, and orientation data, is received by the processing unit 50 from the calliper tool 5 (step 105). The processing unit 50 carries out certain preliminary processing operations on the measured data, such as applying depth corrections, re-calibration against known pipe radii and the like.

Thereafter, the processing unit 50 is operable to re-orient the radii data using the orientation data (step 110). In this way, the data representing the radius of the uppermost part of the pipe 30 is identified, and the rest of the radii data can be associated with an appropriate azimuthal rotation from the uppermost data.

The re-oriented data can then be processed to extract curves representing the eccentricity of the tool in two perpendicular dimensions or planes, in this case, in vertical and cross-well planes extending in a longitudinal direction of the pipe 30 or tool 5 (the cross well plane being rotated by 90 degrees around the centreline of the longitudinally extending pipe from the vertical plane). This advantageously reduces a 3D problem into two 2D computations, thereby reducing the computational resources and time required.

Figure 6:
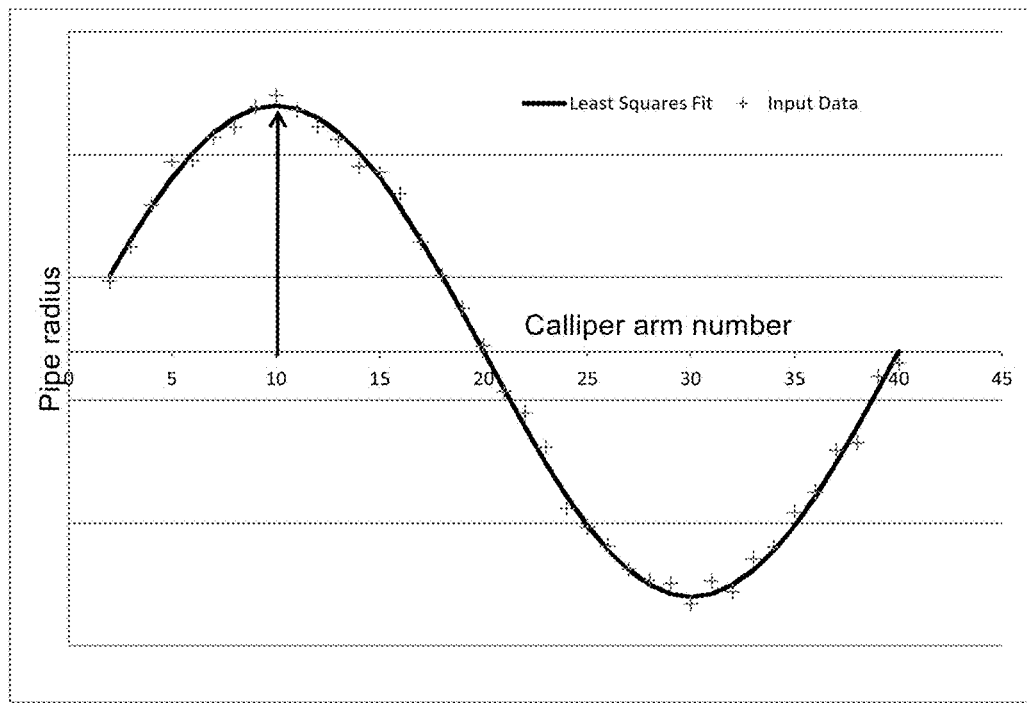
FIG. 6 is a plot showing a least squares fit to radius data measured by the callipers of the calliper tool of FIG. 1 for a given location or depth in a pipe.

The eccentricity for a given measurement position along the length of the pipe 30 can be computed by performing a robust least squares fit to a plot of measured radius to calliper number (equivalent to measurement angle) and then determining a magnitude and angle of the maximum radius 70 in order to determine the magnitude and direction of the measured eccentricity, as illustrated in FIG. 6.

The geometry of a calliper tool 5 results in a predictable response to changes in pipe centreline direction. For example, in the simple case of a single abrupt bend (such as that shown in FIG. 7), a calliper tool with two centralisers and feelers in between will produce eccentricity curves in the vertical and cross well directions having signature effects in the vertical and cross-well eccentricity curves shown in FIG. 10. It will be appreciated that the relative magnitude of the signature effects in the vertical and cross-well directions due to the deformation depends on the direction of the deformation and the relative component of the deformation in each of the vertical and cross-well directions.

Figure 8:
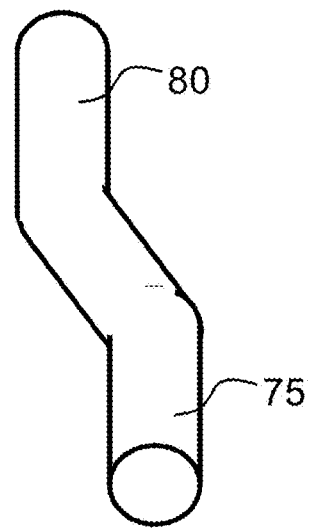
FIG. 8 is an illustration of another deformation model used in an embodiment of the present invention.
Figure 9:
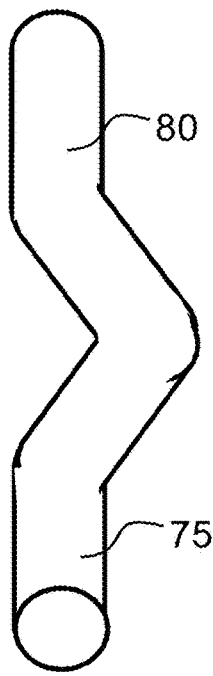
FIG. 9 is an illustration of another deformation model used in an embodiment of the present invention.

Beneficially, all deformations can be constructed as a series of these single bends. Other examples of common deformation models are illustrated by FIGS. 8 and 9, which show a shear deformation and a buckling deformation respectively. In the shear deformation shown in FIG. 8, a part 75 of the pipe 30 below the deformation is parallel but displaced from a part 80 of the pipe that is above the deformation. In the buckling deformation shown in FIG. 9, the pipe 30 returns to its original track after the deformation such that the part 75 of the pipe below the deformation is co-linear with the part 80 of the pipe above the deformation. In the helical buckling deformation shown in FIG. 4, the pipe 30 is arranged into a generally helical configuration.

Corrections 125 can be applied to the eccentricity data to correct for the differing effects of gravity experienced by different callipers 10 depending on the azimuthal angle around the tool body 15 at which the calliper 10 is positioned.

Beneficially, embodiments of the present invention then use the eccentricity data for two planes, i.e. the vertical and cross well planes, to determine the geometry of the pipe 30 in the region of the deformation (step 135).

Figure 11:
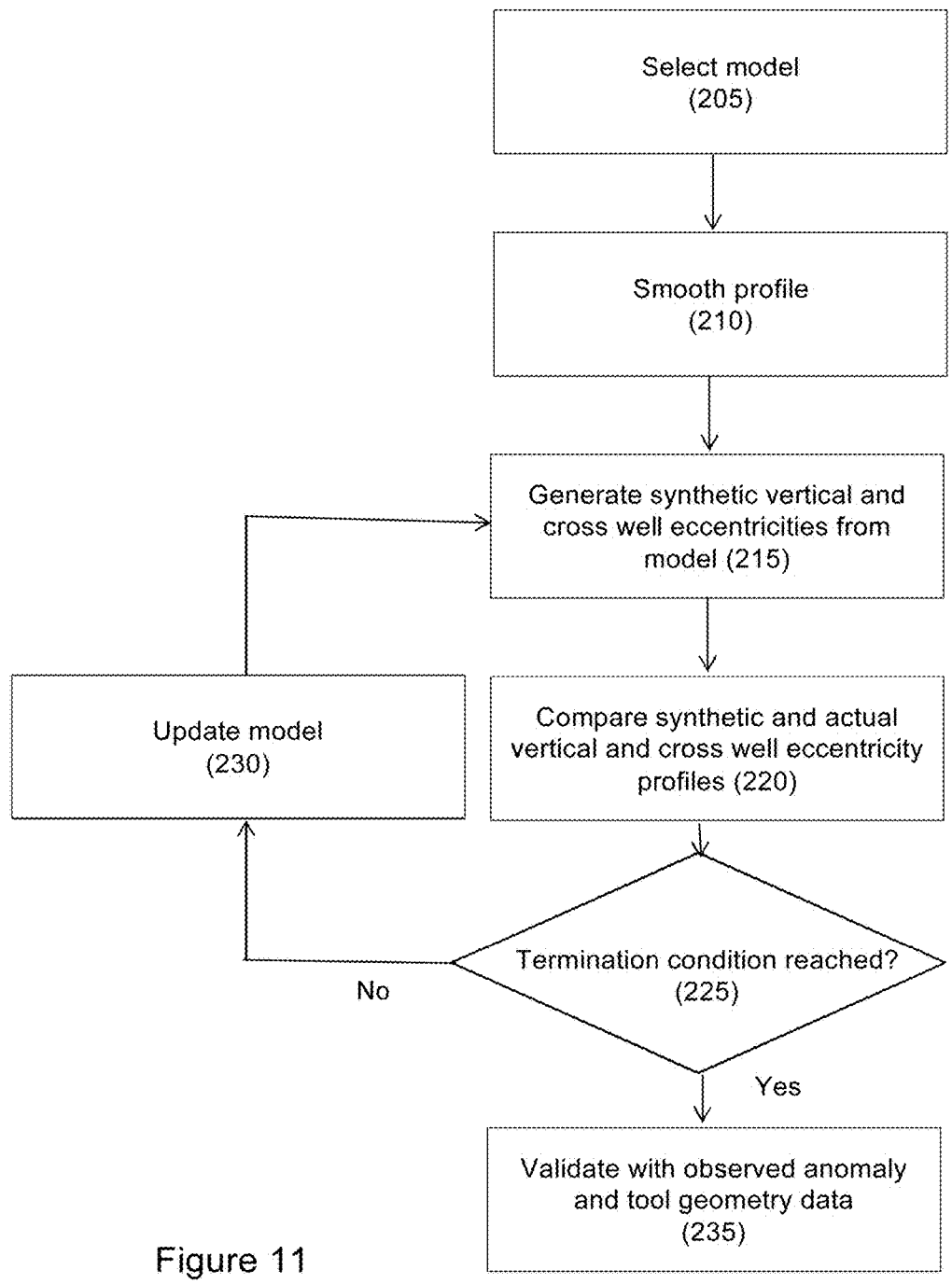
FIG. 11 is a flow diagram illustrating a method according to an embodiment of the present invention.

A method for determining pipe geometry according to one embodiment of the present invention is illustrated in FIG. 11.

In this case, the method comprises a model fitting procedure, wherein an appropriate synthetic model is first generated using the processing unit 50 and then iteratively varied until data derived using the model is fitted to corresponding data derived from the calliper data generated by the calliper tool 5. In particular, an initial 3D model of the pipe in the region of the deformation is constructed or selected from various a-priori models based on a determined or expected deformation type. Synthetic calliper data is then determined from the model and compared to the calliper data measured by the calliper tool 5. The model can then be iteratively varied, e.g. using least squares, manual variation or other techniques until the synthetic calliper data derived from the model matches the actual calliper data determined by the calliper tool 5. The best fit model can then be used to obtain an estimate of the pipe centreline.

Figure 3:
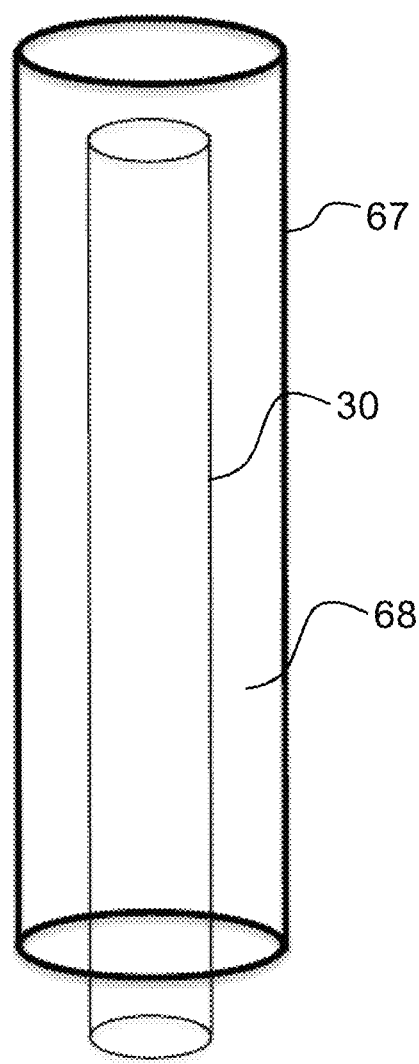
FIG. 3 is an illustration of an example of a pipe arrangement to which the present invention is applicable.
Figure 4:
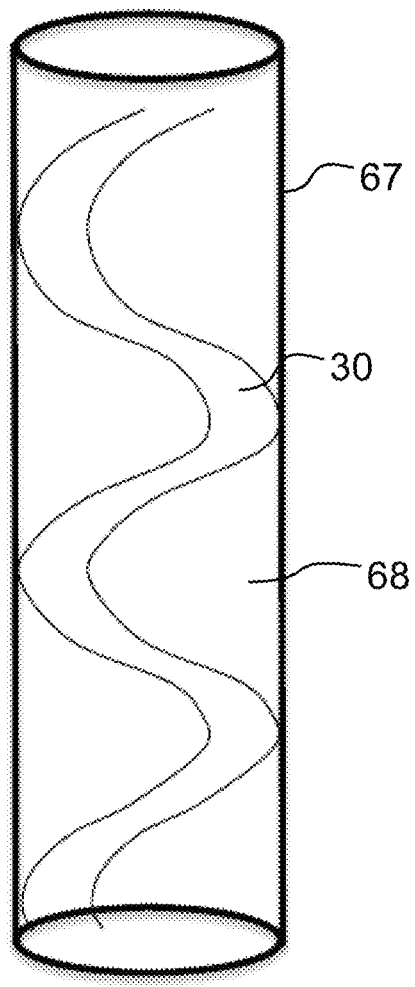
FIG. 4 is an illustration of a deformation model used in an embodiment of the present invention.
Figure 10:
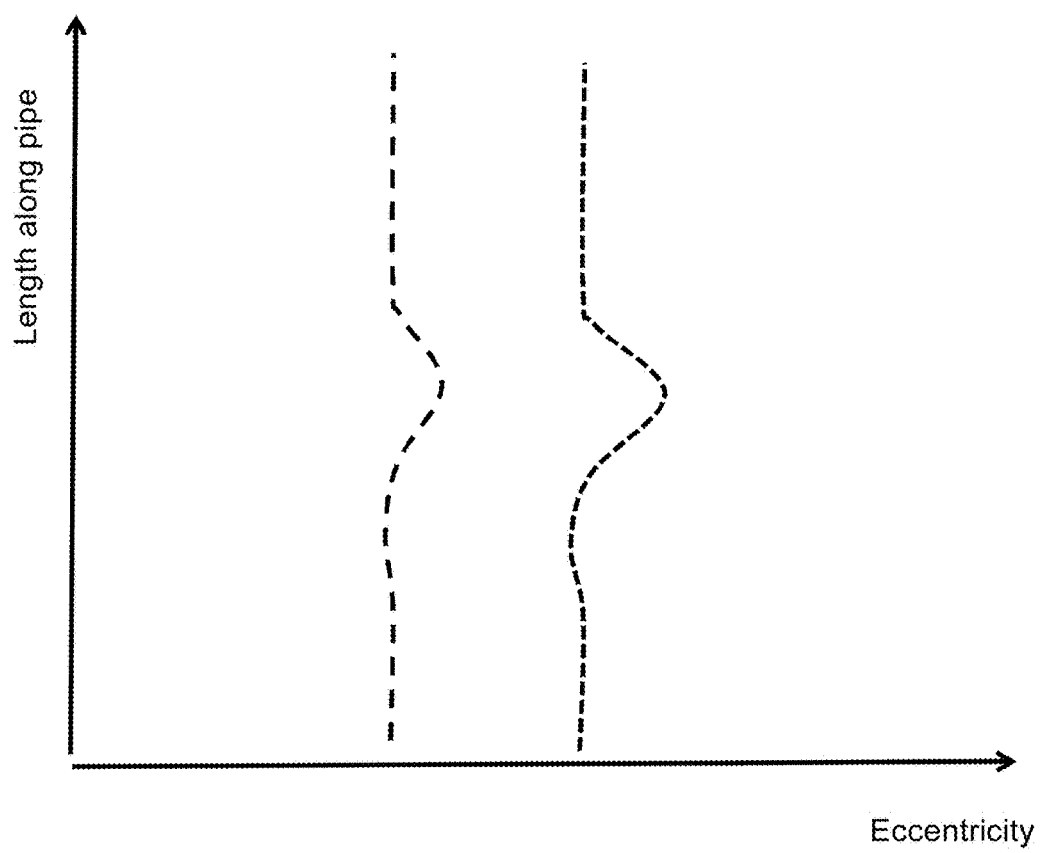
FIG. 10 is a schematic of vertical and cross well eccentricity curves for the model of FIG. 7.

Referring to FIG. 11, in step 205, an appropriate model is selected. Particularly, an estimation of the type of deformation is made and a suitable model selected. In various embodiments, the selection of the appropriate model can be an automated or manual process. The determination of the appropriate deformation model or type can be based on the signature profile in the calliper data or eccentricity data, for example as shown in FIG. 10 for a simple dog leg. Such signatures can often be readily determined in advance, for example, by performing calibration runs on exemplar pipes having known deformation types and/or built up from experience over time. Additionally or alternatively, the behaviour of the calliper tool when faced with a given deformation is predictable, such that the signature associated with a given deformation type could be readily calculated or determined by a skilled person in the art. Knowledge of the location and/or situation of the deformation could also be used to determine an appropriate model type. For example, shear deformations are often associated with fault re-activation or slipping between bedding planes. If these phenomenon are observed, e.g. by using other analytical techniques, then these can act as indicators that a shear deformation model (e.g. as shown in FIG. 8) should be used. As another example, buckling typically occurs in or near a reservoir in low angle wells. As such, if the deformation is in or near a reservoir, and the well is a low angle well, then this may be indicative that a buckling type deformation model, such as that shown in FIG. 9, could be appropriate. If the pipe 30 is provided inside a casing 67, as shown in FIGS. 3 and 4, and optionally if the pipe 30 is subject to temperature, pressure and/or other conditional changes or differences, then this may be indicative that a helical buckling deformation model, such as that shown in FIG. 4, should be used. It will be appreciated that other deformation types would be apparent to a skilled person from the teaching of the present application.

Figure 7:
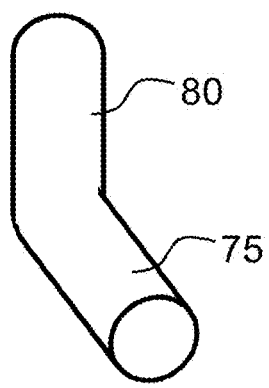
FIG. 7 is an illustration of a deformation model used in an embodiment of the present invention.

Beneficially, the present inventors have found that many deformation types can be formed by combining together two or more dog-leg or single bend deformation models, such as that shown in FIG. 7. Each bend or dog-leg is defined by two depths and an offset. The peaked eccentricity signature for a bend or dog-leg is well defined, as shown in FIG. 10, and an appropriate model that comprises a combination of such bends or dog-legs can be deduced from eccentricity curves that contain a plurality of such peaks.

Advantageously, the present application comprises a validation step of comparing the calculated calliper data for the determined pipe geometry to the actual calliper data collected by the calliper tool 5. If the end result fails this validation step, then it is an indication that the wrong model has been used and that another model may be appropriate. In this case, a different model can be selected and the process can be re-run.

The models contain 3D coordinate data or other shape and orientation data that can be used to represent a 3D shape of a generic pipe that has properties typical of the associated deformation.

After the model has been selected, the model is subjected to a smoothing operation (step 210) to smooth the model shape, for example, by using a running average filter. It has been found that this smoothing process can produce more realistic bends in the model.

In step 215, the model is processed to determine the theoretical eccentricity data in two perpendicular planes or dimensions for the relevant calliper tool passing through a pipe according to the model. In this case, the eccentricity is determined for vertical and cross well planes, extending along the longitudinal direction of, and containing the centreline of, the pipe 30.

In step 220, the initial model can then be fitted to the calliper data collected by the calliper tool by comparing the vertical and cross well eccentricities determined from the calliper data in step 115 with the theoretical vertical and cross well eccentricities determined from the model in step 215. For example, a quality of fit or difference or error function can be generated from the comparison.

In step 225, it is determined if a pre-set termination condition has been reached. Examples of suitable termination conditions include the quality of fit or difference or error function is within a pre-determined threshold or if the change in quality of fit or difference or error function between successive steps is below a threshold.

If the termination condition has been not reached, then in step 230 one or more parameters of the model are varied to produce an updated model. Examples of parameters that could be varied include coordinates of the surface of the pipe in the model or a size, orientation, one or more radii or diameters or other property of the model.

The process then proceeds back to step 215 and new vertical and cross well eccentricities are calculated for the updated model. The process continues in iterative fashion by adjusting the model and determining the difference or error function or quality of fit until the termination condition is reached. For example, the fitting process can use least squares fitting or another suitable method such as genetic algorithms, simulated annealing, monte-carlo or fuzzy logic to minimise the differences between the eccentricities determined for the model and those determined from the measured calliper data. The model can be updated automatically, e.g. as part of a stochastic inversion scheme seeking to minimise the difference or error function or by an analyst.

After the termination condition has been met, a validation operation is performed, in step 235, wherein the final model after fitting is compared to the what would be expected from the observed anomaly and tool geometry to ensure consistency between the determined model and the measured calliper data. Any inconsistencies may be indicative of an error in the process, such as an incorrect model selection.

Figure 12:
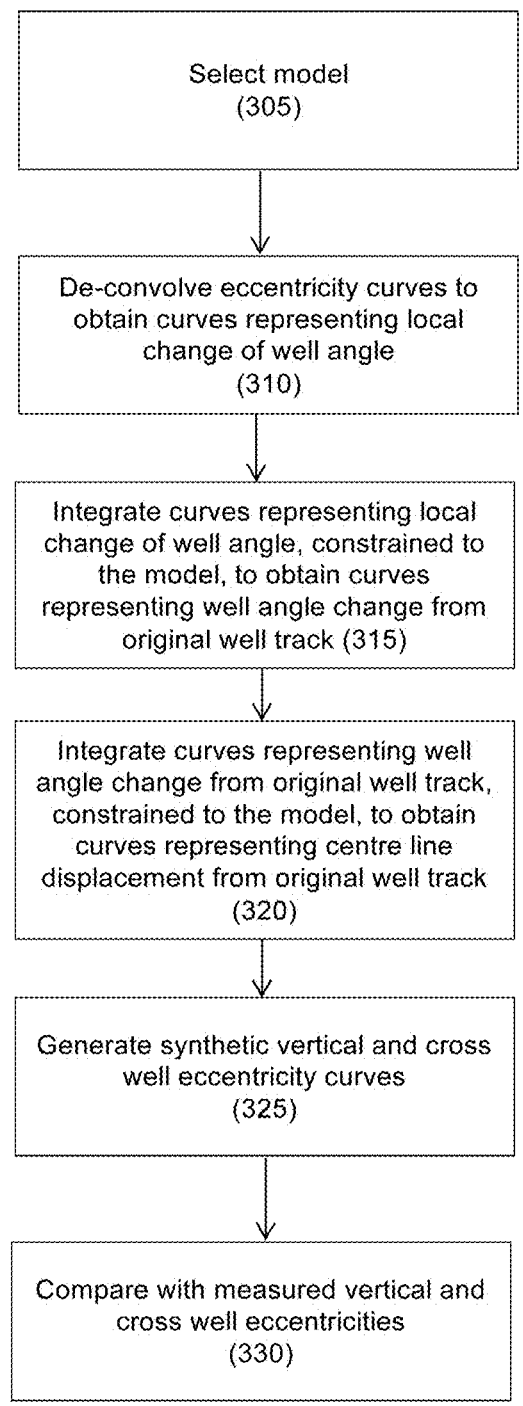
FIG. 12 is a flow diagram illustrating a method according to an embodiment of the present invention.

A direct or full inversion method for determining the geometry of a pipe, particularly a section comprising one or more deformations, is illustrated by FIG. 12. The full inversion method involves recognising and using the tool response at each depth level, in conjunction with the known tool geometry, to de-convolve out the change of pipe centre line angle at each depth or location along the pipe in the region of the deformation. The change in pipe centre line can then be integrated twice, wherein the integrations are constrained by features of a constructed deformation model or deformation model selected from a plurality of a-priori models in order to determine the pipe trajectory profile.

As with the model fitting/inversion method illustrated in FIG. 11 the full inversion method illustrated in FIG. 12 comprises selecting or constructing a deformation model or deformation type (step 305), such as but not limited to, those illustrated in FIGS. 4 and 7 to 9.

However, whereas the model fitting/inversion scheme of FIG. 11 uses the deformation model as a starting point of a fitting process, the method of FIG. 12 uses the selected or constructed deformation model or type to constrain the direct or full inversion method to solutions that equate to "real world" solutions that are consistent with the measured calliper data.

The method starts with the pair of 2D eccentricity curves determined in step 115 above, i.e. the eccentricity curves representing the vertical and cross well planes. In step 310, the known tool geometry is used to de-convolve the eccentricity curves derived from the calliper data in step 115 using the known geometry and response of the calliper tool 5 in order to determine a pair of curves representing local change of pipe or well angle.

The de-convolving step can be sensitive to noise that is found in the measured calliper data. The method advantageously comprises band-limiting the de-convolving, e.g. to exclude low and/or high frequency noise. For example, low frequency noise can be caused by naturally occurring gradual bends and deviations in the pipe track.

The method comprises a first integration of the curves representing the local change of pipe or well angle, as step 315. The first integration is constrained using the selected or constructed deformation model or type in order to ensure the result of the integration is a "real world" solution that is consistent with the calliper data. For example, in both the shear and the buckling deformation models, the net change in angle of the pipe or well from the original pipe or well track is zero over the whole deformation. This can be used to constrain the first integration to produce a solution whose net angle change over the deformation is zero. The solution of the first integration comprises a pair of curves representing pipe or well angle change from the original pipe or well track.

The method comprises a second integration (step 320) in which the curves representative of pipe or well angle change from the original pipe or well track are integrated again in order to produce curves indicative of displacement of the centre line of the pipe or well from that of the original pipe or well track. The second integration is once again constrained using properties of the selected or constructed deformation model or type. For example, for both the shear deformation and the buckling deformation, the centreline of the pipe or well is displaced from the original pipe or well track by a determinable amount depending on the selected or constructed deformation type or model.

In another example that is applicable to situations where the pipe 30 is an inner pipe or tubing located inside an outer pipe or casing 67 (e.g. as shown in FIG. 3) with an annulus 68 therebetween, and particularly (but not essentially) when a helical buckling model is being used, the results of the second integration can be constrained, e.g. using a high pass filter, so that the radial excursion or deviation of the centre line of the inner pipe 30 or tubing does not exceed the value (or another function) of the separation of the casing 67 and the inner pipe 30/tubing (i.e. the annulus 68 size).

Therefore, by constraining the second integration to produce a solution that has a net change in displacement of the centre line of the pipe or well from that of the original pipe or well track that is consistent with the selected deformation model or type, the solutions of the second integration can be constrained to real world solutions that are consistent with the measured data.

From the displacement of the centre line from that of the original pipe or well track determined in the second integration of step 320, it is possible to determine associated eccentricity curves in the vertical and cross well planes, in step 325. In this way, in step 330, the vertical and cross well eccentricity curves generated from the direct/full inversion method can be compared to those determined from the original calliper data that was determined in step 115 of FIG. 5. This provides a validation to ensure that the generated geometry data is consistent with the original calliper data. Any deviations may be indicative of errors in selection or construction of the deformation model, for example.

It will be appreciated that both the method of FIG. 11 and the method of FIG. 12 use a validation step to ensure that a plausible "real world" model has been determined that is consistent with the calliper data measured by the calliper tool 5. This can also act as a check to see if the selected deformation model or type is correct.

Although a variety of validations can be used, one example of a suitable validation involves, for each depth, using an estimated well centre line to determine the position of the centralisers 20 in x, y, z coordinate space. A straight line can be drawn between the two centralisers and used to calculate the coordinates of the tool centre at the depth or location of the callipers 10. The distance between the determined centre line of the pipe or well at this depth and the position of the tool centre at this depth gives the tool eccentricity. This calculation can be repeated for each depth or position to give eccentricity over at least the deformed portion of the pipe 30. The eccentricity can then be resolved into 2D eccentricity curves, e.g. in the vertical and cross well planes, in order to compare to corresponding eccentricity curves generated from the calliper data collected using the calliper tool 5.

Although the methods described in relation to FIGS. 11 and 12 can be used independently as stand-alone procedures, it is possible to combine features from both of these methods into a single method. For example, after the model profile has been smoothed in step 210 shown in FIG. 11, instead of proceeding directly to step 215, the method can instead proceed by carrying out the deconvolving process of step 310 of FIG. 12, following the optional pathway A marked in FIGS. 11 and 12. In this case, after the de-convolving step 310, the method proceeds with the first and second constrained integrations of steps 315 and 320 of FIG. 12, before returning to the method of FIG. 9 via the optional pathway B marked in FIGS. 11 and 12. In this way, the updated model is used in each iteration to constrain the first and second integrations 315 and 320, which may improve the determination of centreline displacement determined thereby.

Regardless of whether the model based fitting/inversion method of FIG. 11 and/or the direct/full inversion method of FIG. 12 is used, the calculated centreline data can be used in conjunction with the original calliper data in order to form a 3D model of the pipe in the region of the deformation. In particular, the originally measured calliper data represents the radii of the pipe measured from the centre of the pipe. As such, the calliper data can be re-centred or wrapped around the revised pipe centreline that was determined using either the method of FIG. 11 or the method of FIG. 12 in order to produce a 3D representation of the pipe 30 geometry in the deformed area, which also shows any corrosion pitting, ovalisation, deposits or other features of the pipe 30.

Furthermore, the known trajectory of the well or pipe can be used to determine the true azimuth of the deformation.

With knowledge of the geometry of the pipe 30, e.g. with the 3D representation of the pipe 30 geometry, it is possible to control operational parameters relating to the pipe, such as an applied pressure, provide alerts if the geometry is determined to pose an increased risk, and the like. One application is in determining clearance of objects, such as tools, equipment or other load items, passing through the pipe and determining if a given object can pass through the pipe, e.g. by determining one or more maximum dimensions of an object that can safely pass through the pipe. This may permit selection of an appropriate tool, load or device and/or provide advance warning of potential blockage situations due to distortion of the pipe.

Figure 13:
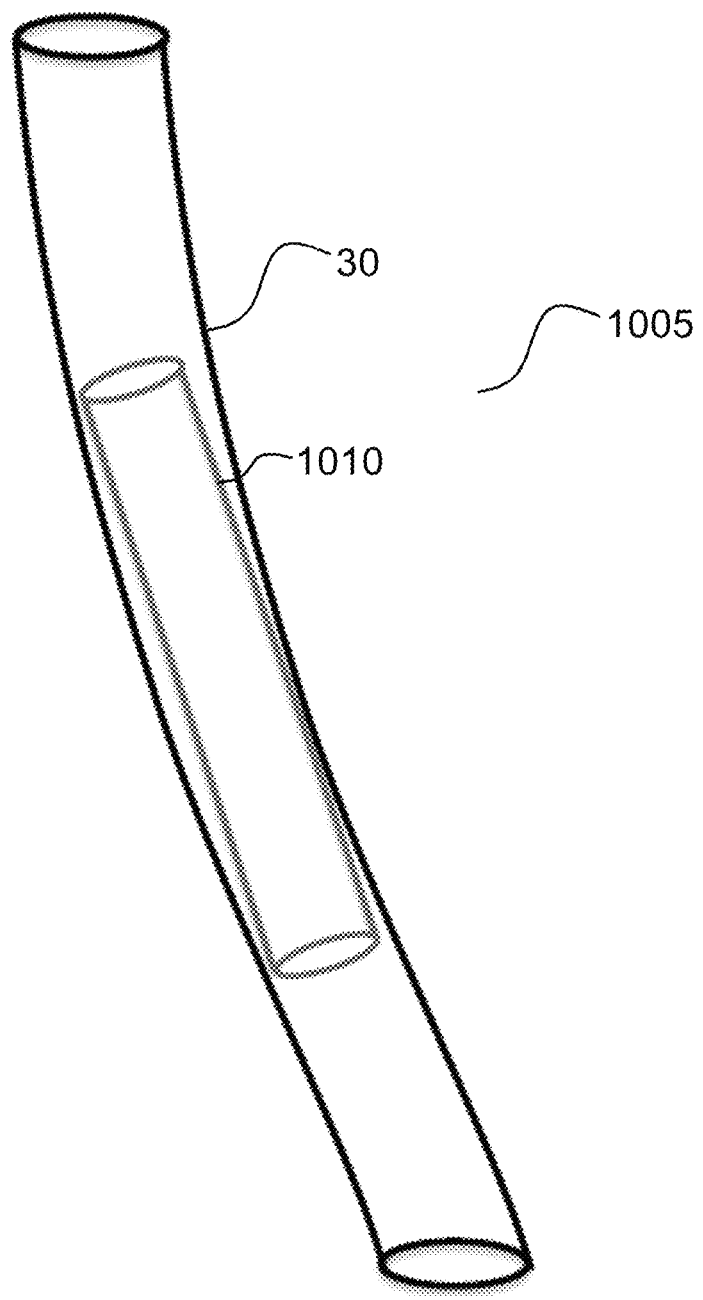
FIG. 13 is a schematic of a tool or load in a pipe having a slowly curving configuration.
Figure 14:
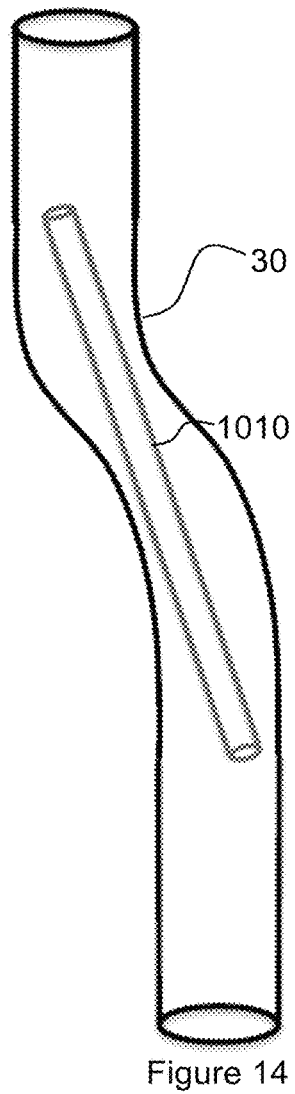
FIGS. 14 to 16 are examples of configurations of parts of pipes comprising the tool or load.
Figure 15:
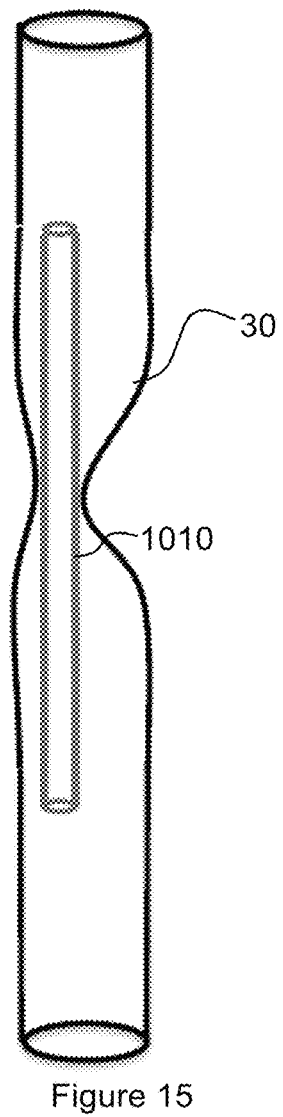
Figure 16:
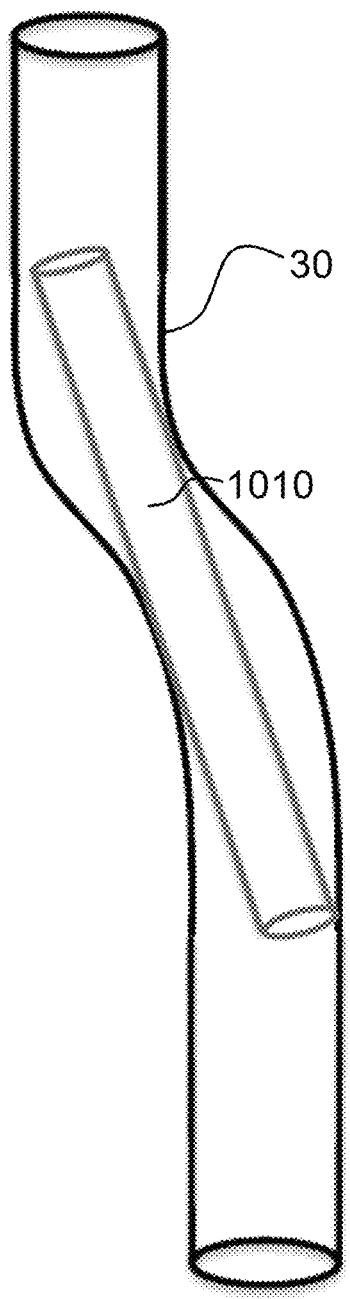

A normal undistorted well 1005, e.g. that comprises a pipe 30 disposed inside a casing with an annulus therebetween, can often be considered to be equivalent to a smooth cylinder that gently bends to follow a desired trajectory from the surface to a sub-sea location, as shown in FIG. 13. During operations, objects 1010 such as tools, or other load items can be conveyed up and down hole, e.g. on drill pipe, coiled tubing or wireline (not shown). Since the pipe 30 generally defines a slowly bending configuration, the widest parts of the object 1010 are usually relatively short compared to the radius of curvature of the well trajectory. In such cases, it may be possible to calculate the drift limits (i.e. one or more maximum dimensions of the object 1010) from the inside diameter and curvature of the pipe 30. However, if a deformation is present, such as those illustrated in FIGS. 14 to 16, in which there is significant deviation over a short depth interval or from a circular cross section, then this method may lead to significantly inaccurate results. The deviations may be due to damage to the pipe 30 or may be due to complex conformations or non-circular cross sections in the pipe 30 and/or through build-up of deposits.

Figure 17:
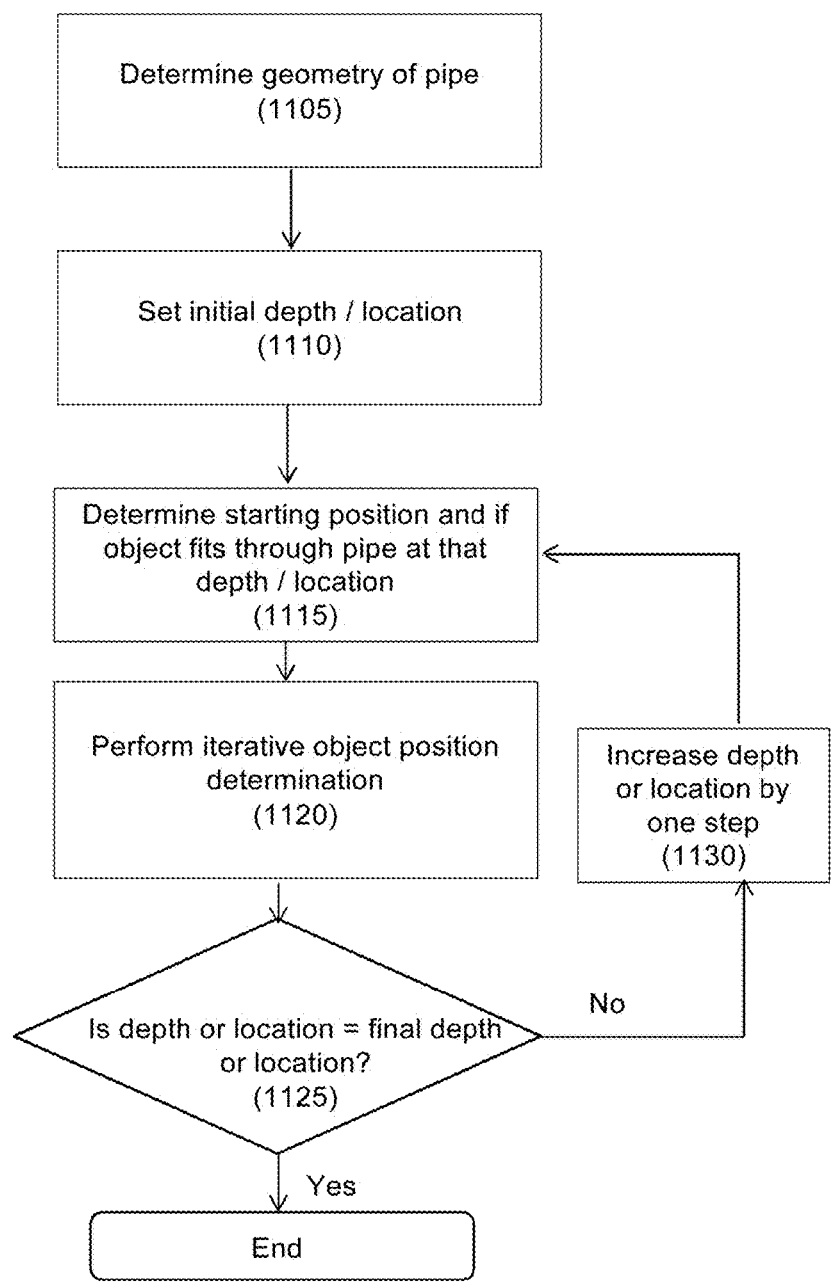
FIG. 17 is a flowchart illustrating a method of determining whether the tool or load will fit through the pipe.

In the method illustrated with respect to FIG. 17, the 3D representation of the pipe 30 geometry, which is advantageously determined using the method of FIG. 11 and/or FIG. 12 but may in other embodiments be determined using another technique, is used to determine clearance of objects 1010 (see FIGS. 14 to 16), such as tools, equipment or other load items, passing through the pipe 30. The method generally involves simulating the passage of the object through the 3D representation of the pipe 30.

Once the geometry of the pipe 30 has been determined or otherwise obtained (step 1105), an initial depth or location along the pipe 30 is considered. The object 1010 can optionally be represented as a rigid cylinder or other radially symmetric object. The method then determines the position/orientation of the object 1010 at the respective depth or location along the pipe 30 that gives a maximum clearance of the object 1010 from the inner surface of the pipe 30. The clearance is the minimum distance between any point on the outer surface of the object 1010 and the inside surface of the pipe 30. The method then repeats the process for a plurality of depths or locations along the pipe 30 (e.g. separated by a predetermined depth or location step, which may correspond to a sample interval of the 3D model of the pipe 30) in order to determine the maximum clearance of the object 1010 for each depth or location along the pipe 30.

The maximum clearance of the object 1010 for each depth or location is determined using an iterative process. For example, the procedure starts at an initial depth or location in the pipe 30 (step 1110). In step 1115, a starting position is determined and a check that the object 1010 can fit through the pipe 30 at that depth or location is made.

In particular, in step 1115, the process starts with the centres of the ends of the object 1010 at the centre of the pipe 30. A position and azimuth on the object 1010 surface that is furthest from the pipe centre line is then determined. The model of the object 1010 is then moved by half the distance between the centre line of the pipe 30 and the position on the surface of the object 1010 that is determined to be furthest from the pipe centre line in a direction opposite to the determined azimuth. Thereafter, it is determined if all of the object 1010 is inside the pipe 30. If it is determined that not all of the object 1010 is within the pipe, then the object 1010 cannot fit through the pipe 30 and an appropriate warning, flag or alert is raised. In this way, it is possible to identify if sending the object 1010 through the pipe 30 will be possible before the object 1010 is inserted, which may prevent blockages and/or damage to the pipe 30 or object 1010.

Figure 18:
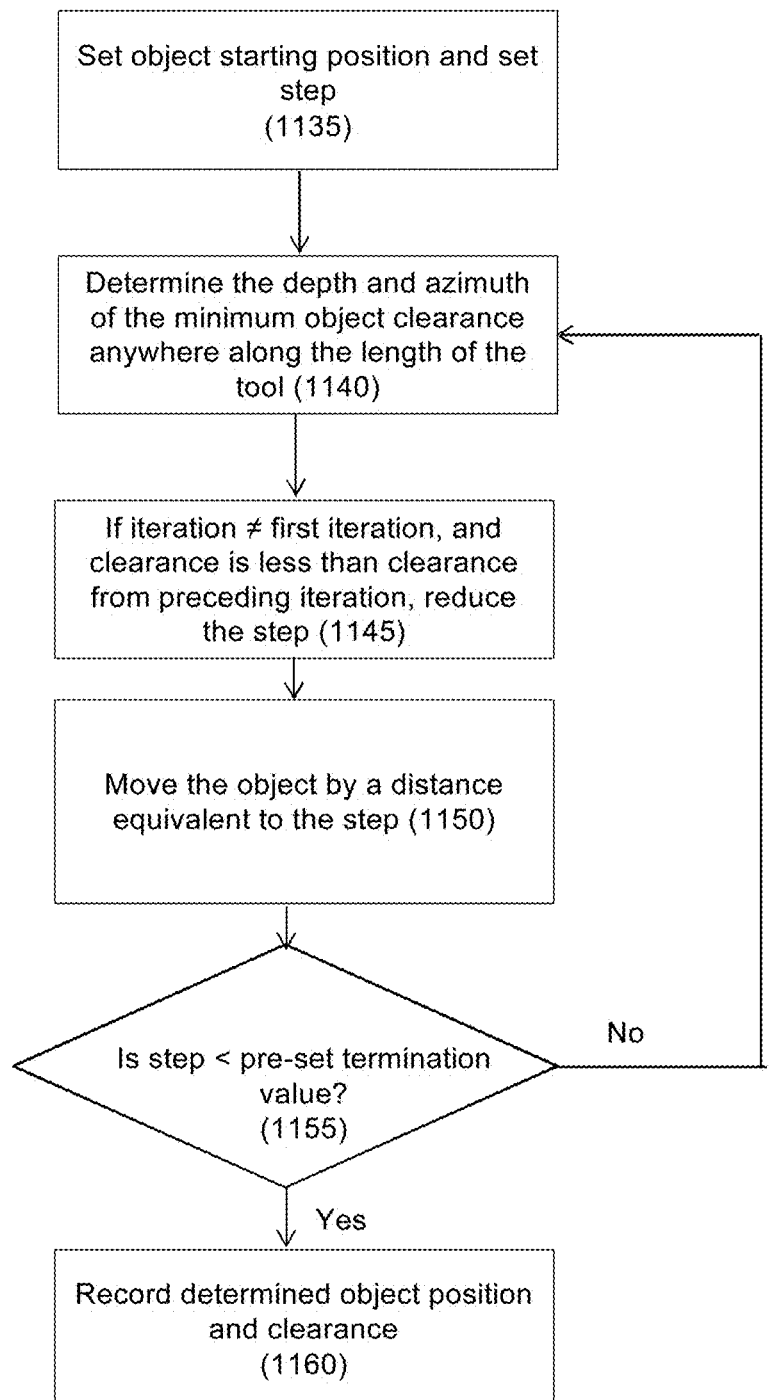
FIG. 18 is a flowchart illustrating a method of optimising a position of an object for clearance with the pipe, for use in the method of FIG. 17.

If it is determined that all of the object 1010 is inside the pipe 30, then the process moves on to an object position optimisation step 1120 that determines the position of the object having optimal clearance between the object and the pipe for that depth/position, as illustrated in detail in FIG. 18.

The steps of determining a starting position of the object 1010 and determining if the object 1010 fits through the pipe 30 at that depth or location in the pipe 30 (step 1110) and determining the object position with optimum clearance (step 1115) are repeated for each pre-set step in depth or location in the pipe 30 until a final depth or location in the pipe 30 has been reached (steps 1125 and 1130).

An example of the iterative object position determination process used in step 1120 is shown in FIG. 18.

In step 1135, the object position optimisation process starts with the tool position resulting from the starting position determination step 1115 above. The position step is initially set to be a pre-set fraction of the nominal diameter of the pipe 30. In step 1140, the depth and azimuth of the minimum clearance between the object 1010 and the pipe 30 for any point on the surface of the tool is determined for the current depth or position in the pipe 30. If the iteration of the object position optimisation process is not the first iteration and the determined clearance is less than the clearance determined in the preceding iteration, then the position step is reduced, e.g. by half, in step 1145.

Figure 19:
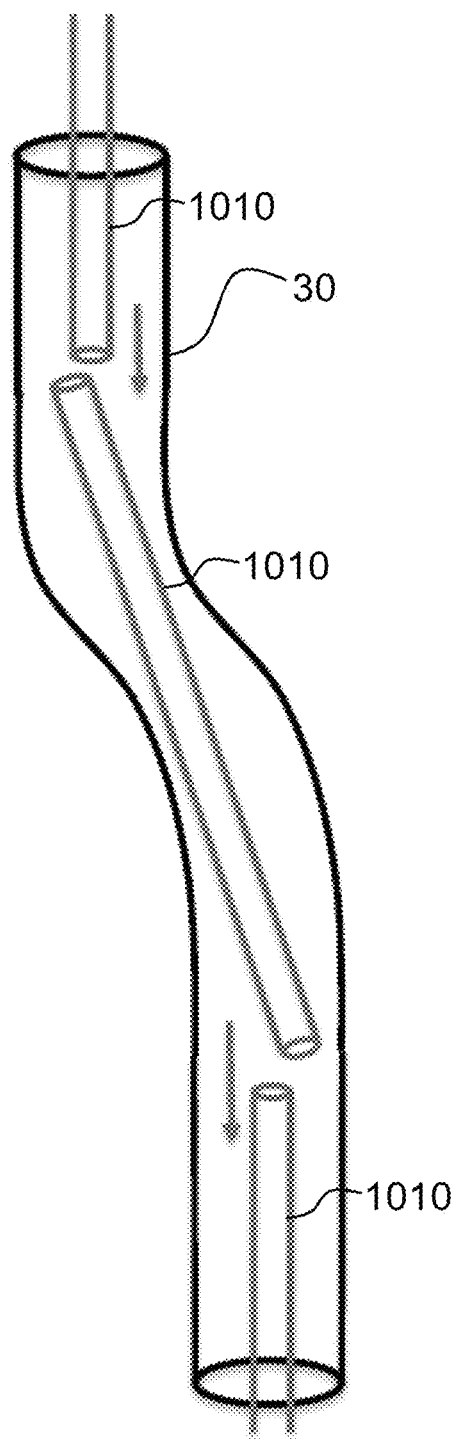
FIG. 19 is a schematic illustrating a plurality of determined positions and orientations of the tool or load having maximum clearance for a variety of locations along the pipe.

The object 1010 is then moved by the current position step away from the position of the object having the minimum clearance determined in the current object position optimisation process in step 1150. A determination is made if the step is less than a pre-set termination value (step 1155). If the step is less than a pre-set termination value, then the iterative object position process terminates by returning the determined position and clearance of the object for the relevant depth or position in the pipe 30 (step 1160). The determined clearance and the associated position/orientation of the object 1010 for that depth or position are stored (see e.g. FIG. 19). This allows the simulation to be replayed as required. Otherwise the iterative object position optimisation process returns to step 1140 and another iteration of the process is performed.

Figure 20:
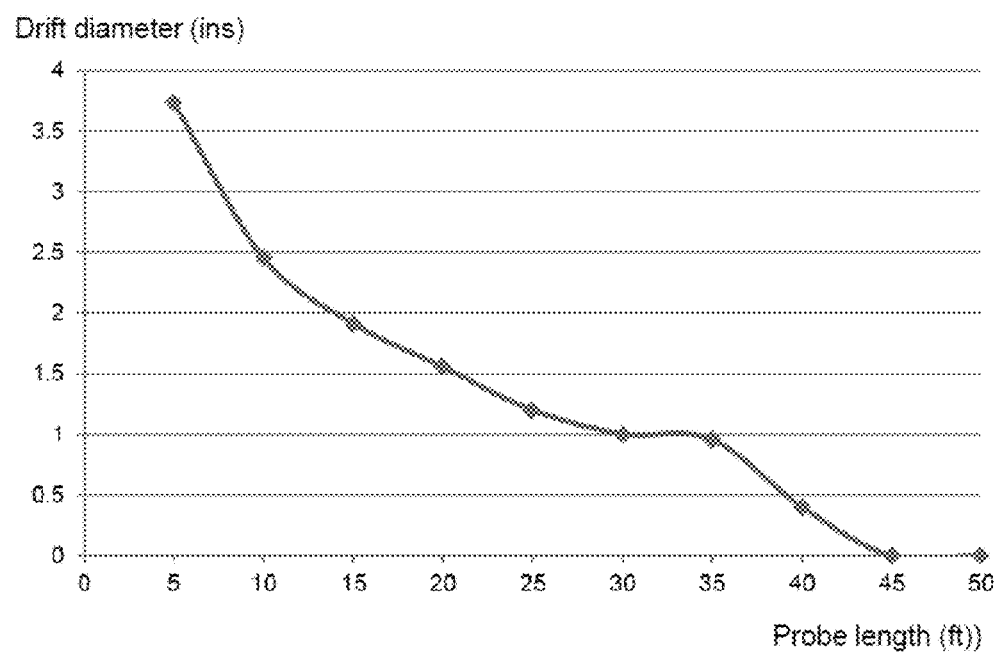
FIG. 20 is a determined plot of overall clearance or drift diameter of the tool or load with length of the tool or load.

Furthermore, the process shown in FIGS. 17 and 18 can be repeated for different dimensions, e.g. length and/or maximum diameter, of object 1010 to thereby identify which objects can be run through the pipe 30. The output of this analysis can be a plot of drift diameter with probe length, for example, as shown in FIG. 20. In the example of FIG. 20, it can be seen that objects 1010 having a length of 45 ft (13.7 m) and over would result in a drift diameter of zero, thereby precluding their use in the associated pipe 30.

It should be understood that the embodiments described herein are merely exemplary and that various modifications may be made thereto without departing from the scope of the invention.

For example, although the specific embodiment advantageously refers to a multi-fingered calliper tool (MFC), it will be appreciated that other measuring devices that provide a measure of pipe, conduit, pile or wellbore radius or diameter could be used, wherein those measuring devices are centred at one or more points that are spaced from the position on the tool form which the measurements are performed. By centering the tool away from the measurement point, the collected data may be used to better determine information regarding the deformation. However, this arrangement may require some form of centreline correction, such as those described above. Examples of other suitable measuring devices may include, ultrasonic, acoustic, laser, microwave or other radiation based measuring devices and/or the like.

Embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

That which is claimed:

1. A method of determining geometry of a deformed pipe or conduit or wellbore, the method comprising:
   receiving measurement data indicative of a plurality of radii of the pipe or conduit collected using a measuring device centred in the pipe at two or more points a known distance from the measurement point but not at the measurement point itself;
   selecting a deformation type and/or deformation model;
   processing the measurement data to determine one or more geometrical properties of the pipe or conduit, the geometrical properties being indicative of, or associated with, one or more deformations, shapes or profiles of at least part of the pipe, conduit or wellbore; and
   guiding and/or constraining at least a part of the processing of the measurement data using the selected deformation type or model and/or fitting the selected deformation model to the measurement data.

2. The method according to claim 1, wherein the measuring device comprises a multi-fingered calliper tool.

3. The method according to claim 1, the method comprising re-orienting the measurement data such that the uppermost data or data collected from the uppermost calliper as determined using an orientation sensor is uppermost.

4. The method according to claim 1, the method comprising determining eccentricity of the measuring device at a plurality of depths or locations along the pipe, conduit or wellbore, wherein the eccentricity is representative of the difference between a centreline of the measuring device at the measurement point and a centreline of the pipe, conduit or wellbore.

5. The method of claim 1, wherein the method comprises determining eccentricity projected into two orthogonal planes or directions through the pipe, conduit or wellbore.

6. The method according to claim 4, wherein the method comprises identifying zones, parts or portions of the pipe, conduit or wellbore for which the eccentricity is anomalous and determining deformation, shape or profile of the pipe, conduit or wellbore for those zones, parts or portions of the pipe, conduit or wellbore determined as having anomalous eccentricities.

7. The method according to claim 1, wherein the deformation model comprises or is indicative of a plurality of bends or dog legs.

8. The method according claim 1, wherein the method comprises fitting the model to the measurement data.

9. The method of claim 8, wherein the fitting comprises fitting a theoretical eccentricity derived from the model in the two or more planes to the eccentricity determined from the measurement data in the two or more planes; and/or
   varying one or more geometrical parameters representing the pipe, conduit or wellbore in the model and re-calculating the eccentricity derived from the model, wherein the one or more geometrical parameters of the model after the fitting process has completed or terminated comprise or are used to determine the geometry of the pipe, conduit or wellbore.

10. The method according to claim 1, wherein the method comprises directly determining the geometry of the pipe, conduit or wellbore.

11. The method according to claim 10, wherein the method comprises deconvolving the eccentricity determined from the measurement data using known geometric properties and/or a known response of the measuring device to produce deconvolved data, wherein the deconvolved data comprises curves or other data representative of local change of well angle.

12. The method according to claim 11, wherein the deconvolving comprises deconvolving the eccentricity only in two or more planes or directions.

13. The method according to claim 11, wherein the method comprises
   applying one or more depth integrations to the deconvolved data or measurement data; the one or more depth integrations comprising:
   a first depth integration, the first depth integration comprising integrating the deconvolved data to determine well angle data; and/or
   a second integration, wherein the second integration comprises integrating the well angle data to determine displacement of the centre line of the pipe, conduit or wellbore from a well or pipe track.

14. The method according to claim 13, wherein the method comprises constraining and/or guiding the first and/or second integration using the selected deformation type or model.

15. The method according to claim 14, wherein:
   constraining the first integration comprises producing zero net angle change over the length of the pipe, conduit or wellbore associated with the deformation; and/or
   constraining the second integration comprises producing a fixed net displacement of the pipe, conduit or well bore over the length of the pipe, conduit or wellbore associated with the deformation.

16. The method of claim 13, wherein the pipe, conduit or structure is comprised or located in an outer pipe, conduit or structure or casing, and the method comprises constraining the results so that a radial difference or excursion of the centre line of the pipe, conduit or structure from the well track is less than a function of the spacing, gap or distance between the pipe, conduit or structure and the outer pipe, conduit or structure.

17. The method according to claim 14, wherein the method comprises determining eccentricities of the measuring device from the determined centre line displacement and comparing the determined eccentricities of the measuring device with the corresponding eccentricities determined from the measurement data.

18. The method according to claim 1, wherein the method comprises applying a high and/or low frequency filter to remove high and/or low frequency measurement data above and/or below one or more frequency thresholds.

19. The method according to claim 1, the method comprising reconstructing or determining a three dimensional model from a determined centre line and the measurement data, wherein the determining of the three dimensional model comprises re-centering the measurement data to the determined centre line.

20. The method according to claim 1, comprising determining clearance and/or maximum length and/or diameter limits for a tool, load or other device to be inserted into the pipe, conduit or other structure from the determined geometry of the pipe, conduit or structure by simulating passage of the tool or other device or load through a computational model of an inside surface of the pipe, conduit or passage, the simulation comprising calculating the position of the tool or other device or load that gives a maximum clearance for each of a plurality of depths or positions of the tool or other device or load over at least part of the pipe, conduit or passage.

21. A system for determining a geometry of a pipe, conduit or wellbore, wherein the system is configured to implement the method according to claim 1.

22. A non-transient carrier medium comprising a computer program product configured to at least partially or wholly implement the method according to claim 1.

23. A method of determining clearance and/or maximum length and/or diameter limits for a tool, load or other device to be inserted into a pipe, conduit or other structure, the method comprising:
   determining or providing a model defining a geometry of the pipe, conduit or structure;
   simulating passage of the tool or other device or load through the model of an inside surface of the pipe, conduit or passage, the simulation comprising calculating the position of the tool or other device or load that gives a maximum clearance for each of a plurality of depths or positions of the tool or other device or load over at least part of the pipe, conduit or passage.

* * * * *